US006400788B1

(12) United States Patent
Hirano et al.

(10) Patent No.: US 6,400,788 B1
(45) Date of Patent: *Jun. 4, 2002

(54) FUEL ASSEMBLY

(75) Inventors: Atsuya Hirano; Satoshi Kanno, both of Hitachi; Makoto Irube, Hitachinaka; Hideki Kurosaki, Hitachi; Yasuhiro Aizawa, Hitachi; Takashi Fukumoto, Hitachi, all of (JP)

(73) Assignees: Hitachi, Ltd., Tokyo; Hitachi Engineering Co., Ltd., Hitachi, both of (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/245,899

(22) Filed: Feb. 8, 1999

(30) Foreign Application Priority Data

| Feb. 10, 1998 | (JP) | ............................................ 10-028389 |
| Feb. 26, 1998 | (JP) | ............................................ 10-045241 |
| Jan. 18, 1999 | (JP) | ............................................ 10-009531 |

(51) Int. Cl.$^7$ .................. G21C 3/326; G21C 3/328; G21C 3/344
(52) U.S. Cl. ............... 376/438; 376/435; 376/439; 376/442; 376/443; 376/462
(58) Field of Search ................. 376/435, 438, 376/439, 442, 443, 446, 462

(56) References Cited

U.S. PATENT DOCUMENTS

| 3,350,275 A | * | 10/1967 | Venier et al. ............... 376/434 |
| 3,431,171 A | * | 3/1969 | Glandin ....................... 376/441 |
| 4,312,705 A | * | 1/1982 | Steinke ....................... 376/441 |
| 4,544,522 A | * | 10/1985 | Curulla et al. ............... 376/441 |
| 5,089,221 A | * | 2/1992 | Johansson et al. .......... 376/442 |
| 5,209,899 A | * | 5/1993 | Johansson et al. .......... 376/442 |
| 5,432,829 A | * | 7/1995 | Aoyama et al. ............. 376/434 |
| 5,815,545 A | * | 9/1998 | Johansson .................... 376/442 |

FOREIGN PATENT DOCUMENTS

JP 02-163695 * 6/1990

(List continued on next page.)

*Primary Examiner*—Michael J. Carone
*Assistant Examiner*—Jack Keith
(74) *Attorney, Agent, or Firm*—Antonellli, Terry, Stout & Kraus, LLP

(57) ABSTRACT

A fuel assembly, particularly, a fuel assembly including short-length fuel rods and fuel spacers, is used for a boiling water reactor, which is capable of sufficiently reducing the pressure loss of at least one of the fuel spacers positioned above the upper ends of the short-length fuel rods, irrespective of the arrangement of the short-length fuel rods, and also ensuring the structural strength of the fuel spacer. The fuel assembly includes fuel rods located in a square lattice array, two water rods arranged in a region in which seven of the fuel rods are arrangeable, two fuel spacers for holding the fuel rods and the water rods with mutual intervals kept immovable. Each of the fuel spacers includes cells which are connected to each other and in which the fuel rods are to be inserted, respectively, and a band for surrounding the outermost peripheries of the cells. The short-length fuel rods include four first short-length fuel rods arranged in the outermost peripheral region of the square lattice array. One of the fuel spacers, positioned upward from the upper ends of the short-length fuel rods, is configured such that the cells located at lattice positions associated with the first short-length fuel rods are removed and instead supporting members, each being adapted to connect two of the cells adjacently located on both sides of each of the lattice positions in the outermost peripheral region to the band, are provided at the lattice positions.

7 Claims, 19 Drawing Sheets

FOREIGN PATENT DOCUMENTS

| | | | |
|---|---|---|---|
| JP | 05-232273 | * | 9/1993 |
| JP | 06-003473 | * | 1/1994 |
| JP | 06-273560 | * | 9/1994 |
| JP | 06-294879 | * | 10/1994 |
| JP | 10-253792 | * | 9/1998 |
| JP | 10-311889 | * | 11/1998 |
| JP | 11-038171 | * | 2/1999 |
| JP | 11-064558 | * | 3/1999 |

* cited by examiner

FUEL ASSEMBLY

BACKGROUND OF THE INVENTION

The present invention relates to a fuel assembly, and more particularly to a fuel assembly, including fuel spacers, used for a boiling water reactor.

A fuel assembly used for a boiling water reactor has been disclosed, for example, in Japanese Patent Laid-open No. Hei 2-163695. This fuel assembly includes a plurality of fuel rods and two water rods. The fuel rods are arranged in a square lattice array of 9 rows×9 columns. These fuel rods and water rods, which form a fuel bundle, are held at mutual specific intervals and are kept immovable by a plurality of fuel spacers arranged in the axial direction.

The fuel spacer includes a large number of cylindrical members; one band member; a plurality of loop-shaped springs; and water rod holding members, each being formed into an approximately Ω-shape in transverse cross-section, for holding the water rods. The large number of cylindrical members are joined to each other and are bundled. Each cylindrical member is provided at a lattice position at which a fuel rod is to be inserted, and an associated one of the fuel rods is inserted in each cylindrical member. The band member, formed into a square shape, surrounds the outer periphery of the bundle of the large number of cylindrical members.

The band member has projecting members (bath-tubs) which project on the inner peripheral side of a fuel channel box and is brought in contact with the inner surface of the fuel channel box. The loop-shaped spring is provided at a joined portion between a pair of the adjacent cylindrical members for pressingly supporting the fuel rods inserted in the adjacent cylindrical members. In addition, the loop-shaped spring functions to generate pressing forces when the fuel rods are inserted in the adjacent cylindrical members.

The water rod holding member is joined to two of the cylindrical members adjacent to the water rod. In the case where the loop-shaped springs are intended to be arranged for holding the fuel rods in the two cylindrical members adjacent to the water rod, since the mating one paired with each of the two cylindrical members is not present from the viewpoint of arrangement of springs over the fuel spacer, the spring function cannot be achieved. To cope with such an inconvenience, a spring pressing projecting piece and a spring holding projecting piece are provided at a joined portion between the water rod holding member and each of the above two cylindrical members, so that a pressing force necessary for holding the fuel rod is generated by holding the loop-shaped spring using the spring holding projecting piece and pressing it using the spring pressing projecting piece.

On the other hand, to improve nuclear characteristics of a fuel assembly for a boiling water reactor, as described in Japanese Patent Laid-open No. Hei 5-232273, there is a known configuration provided with a plurality of fuel rods including rods (hereinafter, referred to as short-length fuel rods) each having a length shorter than that of each of the remaining ones of the fuel rods. In the fuel assembly disclosed in the above-mentioned document, to improve the controllability of the reactivity due to reduction in the void coefficient, the short-length fuel rods are arranged in the outer peripheral region of the square lattice array and adjacent to the water rods.

The fuel spaces, as described above, are provided at a plurality of positions in the axial direction. As a result, of the fuel spacers used for the above fuel assembly, including the short-length fuel rods, those positioned above the upper ends of the short-length fuel rods have no fuel rod portions at lattice positions associated with the short-length fuel rods. In this regard, there has been already proposed a structure in which, in the fuel spacer positioned above the upper ends of the short-length fuel rods, the cylindrical members located at the lattice positions associated with the short-length fuel rods are removed to reduce the pressure loss.

However, in the fuel assembly disclosed in Japanese Patent Laid-open No. Hei 5-232273 in which, the short-length fuel rods are arranged in the outermost peripheral region of the square lattice array and adjacent to the water rods, if it is intended to simply remove the cylindrical members located at the lattice positions associated with the short-length fuel rods in the fuel spacer positioned above the upper ends of the short-length fuel rods, the following two problems are likely to occur:

(1) Problem in Terms of Strength

In a usual fuel spacer, short-length fuel rods are located in an inner region (not outermost peripheral region) of a square lattice array of fuel rods. As a result, even by removing cylindrical members located at the lattice positions associated with the short-length fuel rods to reduce the pressure loss, the cylindrical members in the outermost region are continuously in contact with a band member which surrounds the outer periphery of the fuel spacer, so that the structural strength of the entire fuel assembly is little reduced.

For example, if an external force is applied to the fuel spacer via a fuel channel box in case of an earthquake or upon handling of the fuel assembly, the load is first transmitted to projecting members provided on the band member. After that, the load is transmitted, via the band member, to the cylindrical members in the outermost peripheral region of the square lattice array joined to the inner side of the band member, and then the force is sequentially transmitted to the cylindrical members arranged on the inner peripheral side of the square lattice array. In the case where the band member and the cylindrical members are substantially continuously arranged in the transmission path of the load, as described above, the joined body of the band member and the cylindrical members exhibits, as one body, an effect of ensuring the strength, to thereby sufficiently ensure the structural strength of the entire fuel spacer.

On the contrary, in the case where the cylindrical members located at the lattice positions associated with the short-length fuel rods in the outer peripheral region are removed, the arrangement of the cylindrical members in the outermost peripheral region of the square lattice array becomes discontinuous at the positions where the cylindrical members are removed. This makes the strength ensuring effect of the joined body, which is composed of a large number of the cylindrical members, insufficient, and thereby reduces the structural strength of the entire fuel spacer.

To minimize such a reduction in strength, for example, Japanese Patent Laid-open No. Hei 6-3473 discloses a fuel spacer having a structure in which eight bath-tubs for mainly receiving forces applied from a fuel channel box are provided on a square-shaped band member. To be more specific, two of the bath-tubs are provided on each side of the band member in such a manner as to face to two of the bath-tubs provided on the opposed side of the band member; and cylindrical members are necessarily provided at all of the lattice positions between the two of the facing bath-tubs to ensure the strength, and the cylindrical members located at the other lattice positions are removed to reduce the pressure loss.

The fuel spacer disclosed in Japanese Patent Laid-open No. Hei 6-3473, however, causes another problem.

That is to say, in the design of a fuel assembly including short-length fuel rods, the arrangement of the short-length fuel rods varies depending on the required nuclear characteristics. However, in the above fuel spacer, the cylindrical members located at all of the lattice positions between the two of the facing bath-tubs cannot be omitted, and accordingly, if the short-length fuel rod is arranged at one of the lattice positions between the two of the facing bath-tubs, it fails to sufficiently reduce the pressure loss. Conversely, in the case of giving precedence to a sufficient reduction in pressure loss, the short-length fuel rods cannot be arranged at all of the lattice positions between two of the facing bathtubs, and correspondingly, the degree of freedom in design of the fuel assembly is limited.

(2) Problem in Terms of Spring Arrangement

In the above fuel assembly in which the short-length fuel rods are arranged in the outermost peripheral region and adjacent to the water rods, if the cylindrical members located at the lattice positions associated with the short-length fuel rods in the fuel spacer positioned above the upper ends of the short-length fuel rods are simply removed, there occurs another problem.

Description of such a problem will be presented by way of example with reference to the fuel assembly shown in FIGS. 2 and 3 (described later). This fuel assembly includes fuel rods located in a square lattice array of 9 row×9 columns, and two water rods are arranged in a region in which seven of the fuel rods are arrangeable. Further, in the fuel assembly, four of the short-length fuel rods are arranged one at each midpoint of each side of the outermost periphery of the square lattice array, and two of the short-length fuel rods are arranged at two corners of a square lattice array of 3 row×3 columns at a central portion of the fuel spacer in such a manner as to be adjacent to the water rods.

It is assumed that in the fuel spacer positioned above the upper ends of the short-length fuel rods in the above-described fuel assembly, cells located at lattice positions associated with the short-length fuel rods are simply removed, and, like the prior art manner, only one kind of loop-shaped springs are used for eliminating an increase in the number of parts. In this case, there occurs a requirement to entirely review the arrangement of the loopshaped springs over the fuel spacer. The re-arrangement of the springs is shown as a comparative example in FIG. 24.

Referring to FIG. 24, in a fuel spacer 103, cells 104 in the form of cylindrical members are bundled and joined to each other. A loop-shaped spring 105 for pressingly holding fuel rods 101 is provided at a joined portion between a pair of the adjacent cells 104. At this time, the provision of the cells 104 at six lattice positions 106a, 106b, 106c, 106d, 106e, and 106f associated with the short-length fuel rods 101A is omitted to reduce the pressure loss. As a result of omission of the cells 104, as shown in FIG. 24, the arrangement of the loop-shaped springs 105 is entirely changed from that described in Japanese Patent Laid-open No. Hei 2-163695.

In the re-arrangement of the springs shown in FIG. 24, two of the loop-shaped springs 105A and. 105B, each of which is free, that is, has no mating cell paired therewith, are adjacently present at each of the lattice positions 106e and 106f, that is, at the two corners of the square lattice array of 3 row×3 columns in the, central portion of the fuel spacer, in such a manner as to be adjacent to the water rods 102. To allow the loop-shaped springs 105A and 105B to exhibit a spring function, it is required to provide a spring pressing structure allowing the loopshaped springs 105A and 105B to simultaneously generate pressing forces at each of the lattice positions 106e and 106f.

However, such a spring pressing structure for mounting two or more of the free loop-shaped springs at one lattice position has not been known. Further, it is also required to examine a connection mechanism between the spring pressing structure and a water rod holding member 108, formed into an approximately Ω-shape in transverse cross-section, for holding the water rod.

SUMMARY OF THE INVENTION

A first object of the present invention is to provide a fuel assembly which is capable of sufficiently reducing the pressure loss of a fuel spacer positioned upward from the upper ends of short-length fuel rods irrespective of the arrangement of the short-length fuel rods and ensuring the structural strength of the fuel spacer.

A second object of the present invention is to provide a fuel assembly which is capable of sufficiently reducing the pressure loss of a fuel spacer positioned upward from the upper ends of short-length fuel rods irrespective of the arrangement of the short-length fuel rods and reasonably arranging the necessary minimum number of one kind of loop-shaped springs over the fuel spacer.

(1) To achieve the above first object, according to the present invention, there is provided a fuel assembly including:

- a plurality of fuel rods located in a square lattice array, the fuel rods including a plurality of short-length fuel rods each having a fuel active length shorter than that of each of the remaining ones of the fuel rods;
- at least one water rod arranged in a region in which one or more of the fuel rods are arrangeable; and
- a plurality of fuel spacers, provided at a plurality of positions in the axial direction, for holding the plurality of fuel rods and the at least one water rod with mutual radial intervals thereof kept immovable;
- wherein the plurality of short-length fuel rods include at least one first short-length fuel rod arranged in the outermost peripheral region of the square lattice array;
- each of the plurality of fuel spacers includes a plurality of cylindrical members which are connected to each other and in which the fuel rods are to be inserted respectively, and a band member for surrounding the outermost peripheries of the plurality of cylindrical members; and
- the plurality of fuel spacers include first fuel spacers positioned above the upper end of the at least one first short-length fuel rod, and at least one of the first fuel spacers is configured such that one of the cylindrical members, located at a first lattice position associated with the at least one first short-length fuel rod, is omitted, and, instead, a first supporting member for connecting two first cylindrical members, of the plurality of cylindrical members, adjacently located on both sides of the first lattice position in the outermost peripheral region adjacent to the band member, is provided at the first lattice position.

When a plurality of fuel spacers are provided at a plurality of positions in the axial direction, no fuel rod is present at the first lattice position associated with the at least one first short-length fuel rod in the first fuel spacer positioned above the upper end of the at least one first short-length fuel rod. Accordingly, by omitting the cylindrical member located at the first lattice position, it is possible to reduce the flow resistance of a coolant flowing upward in the fuel assembly, and hence to sufficiently reduce the pressure loss.

The omission of the cylindrical member makes for a discontinuous arrangement of the cylindrical members located in the outermost peripheral region of the square lattice array at the first lattice position. However, by connecting the two first cylindrical members on both sides of the first lattice position in the outermost peripheral region to the band member by means of the first supporting member, the two first cylindrical members are fixed to each other via the band member. With this configuration, a load transmitted from the band member can be received by the connected structure composed of the two first cylindrical members and the first supporting member fixedly connected to each other.

This allows the first fuel spacer to exhibit a structural strength substantially comparable to that of a fuel spacer in which the cylindrical member is present at the first lattice position. The first supporting member can be arranged irrespective of arrangement of the bath-tubs, and accordingly, unlike the prior art structure, even when the first short-length fuel rod is located at a position between the two opposed bath-tubs in the outermost peripheral region, the cylindrical member at the position can be removed and instead the first supporting member can be provided thereat to sufficiently reduce the pressure loss.

As described above, it is possible to sufficiently reduce the pressure loss of the first fuel spacer positioned above the upper end of the first shortlength fuel rod while usually ensuring the structural strength of the first fuel spacer irrespective of the arrangement of the first short-length fuel rod.

(2) To achieve the above first object, according to the present invention, there is also provided a fuel assembly including:

a plurality of fuel rods arranged in a square lattice array, the fuel rods including a plurality of short-length fuel rods each having a fuel active length shorter than that of each of the remaining ones of the fuel rods;

at least one water rod arranged in a region in which one or more of the fuel rods are arrangeable; and a plurality of fuel spacers, provided at a plurality of positions in the axial direction, for holding the plurality of fuel rods and the at least one water rod with mutual radial intervals thereof kept immovable;

wherein the plurality of short-length fuel rods include at least one first short-length fuel rod arranged in the outermost peripheral region of the square lattice array;

each of the plurality of fuel spacers includes a plurality of cylindrical members which are connected to each other and in which the fuel rods are to be inserted respectively, and a band member for surrounding the outermost peripheries of the plurality of cylindrical members; and the plurality of fuel spacers include first fuel spacers positioned above the upper end of the at least one first short-length fuel rod, and at least one of the first fuel spacers is configured such that one of the cylindrical members, located at a first lattice position associated with the at least one first short-length fuel rod, is omitted, and, instead, a second supporting member for connecting two pieces of first cylindrical members, of the plurality of cylindrical members, adjacently located on both sides of the first lattice position in the outermost peripheral region, to a second cylindrical member, of the plurality of cylindrical members, located inwardly from and adjacently to the first lattice position.

When a plurality of the fuel spacers are provided at a plurality of positions in the axial direction, no fuel rod is present at the first lattice position associated with the at least one first short-length fuel rod in the first fuel spacer positioned above the upper end of the at least one first short-length fuel rod. Accordingly, by omitting the cylindrical member located at the first lattice position, it is possible to reduce the flow resistance of a coolant flowing upward in the fuel assembly, and hence to sufficiently reduce the pressure loss.

The omission of the cylindrical member makes for a discontinuous arrangement of the cylindrical members located in the outermost peripheral region of the square lattice array at the first lattice position. However, by connecting the two first cylindrical members on both sides of the first lattice position in the outermost peripheral region to the second cylindrical member located inwardly from and adjacently to the first lattice position by means of the second supporting member, the two first cylindrical members are fixed to each other via the second cylindrical member. With this configuration, a load transmitted from the band member can be received by the connected structure composed of the two first cylindrical members, second supporting member, and second cylindrical member fixedly connected to each other.

This allows the first fuel spacer to exhibit a structural strength substantially comparable to that of a fuel spacer in which the cylindrical member is present at the first lattice position. The second supporting member can be arranged irrespective of arrangement of the bath-tubs, and accordingly, unlike the prior art structure, even when the first short-length fuel rod is located at a position between the two opposed bath-tubs in the outermost peripheral region, the cylindrical member at the position can be removed and instead the second supporting member can be provided thereat to sufficiently reduce the pressure loss.

As described above, it is possible to sufficiently reduce the pressure loss of the first fuel spacer positioned above the upper end of the first shortlength fuel rod while usually ensuring the structural strength of the first fuel spacer irrespective of arrangement of the first short-length fuel rod.

(3) In the configuration of the invention described in section (1) or section (2), preferably, the first or second supporting member has a transverse cross-section smaller than that of the cylindrical member.

(4) In the configuration of the invention described in section (1) or section (2), preferably, the at least one first fuel spacer includes, at a connection portion between one of the two first cylindrical members and the first or second supporting member, spring pressing means for imparting a pressing force to a spring for holding the fuel rod inserted in the one of the two first cylindrical members. With this configuration, it is possible to increase the degree of freedom in arrangement of the fuel rod holding springs in the fuel spacer.

(5) In the configuration of the invention described in section (1) or section (2), preferably, the plurality of short-length fuel rods include at least one second short-length fuel rod arranged in a region adjacent to the at least one water rod;

each of the plurality of fuel spacers includes a water rod holding member connected to those of the plurality of cylindrical members arranged in the innermost peripheral region of the square lattice array for holding the at least one water rod; and the at least one first fuel spacer is configured such that one of the cylindrical members, located at a second lattice position associated with the at least one second short-length fuel rod, is omitted and instead a third supporting member for connecting two third cylindrical members, of the plurality of cylindrical members, located outwardly from and adjacently to the second lattice position in the square lattice array to the water rod holding member.

(6) In the configuration of the invention described in section (1) or section (2), preferably, each of the plurality of fuel spacers includes a plurality of first projecting members provided on the band member, the first projecting member projecting between the two adjacent ones of the cylindrical members in the outermost peripheral region of the square lattice array for introducing the flow of a coolant; and the at least one first fuel spacer is configured such that at least one of the projecting members adjacent to the first or second supporting member is omitted.

The provision of the first projecting members in each fuel spacer is effective to direct the flow of a coolant in the fuel assembly toward the fuel rod side as much as possible, and hence to improve the effect of cooling the fuel rods and enhance the critical power characteristic. In the first fuel spacer positioned above the upper ends of the short-length fuel rods, no fuel rod is present at the first lattice position at which the first or second supporting member is provided. Accordingly, the provision of the first projecting members in the vicinity of the first or second supporting member is not effective so much. For this reason, by omitting the first projecting members adjacent to the first or second supporting member, it is possible to reduce an increment of pressure loss due to the projecting shapes thereof, and hence to further reduce the pressure loss.

(7) In the configuration of the invention described in section (6), preferably, the at least one first short-length fuel rod is arranged in the outermost peripheral region except for four corners of the square lattice array. The effect of improving the critical power characteristic is largest at the four corners in the outermost peripheral region of the square lattice array, and becomes smaller at other positions in the outermost peripheral region.

Accordingly, in the case where the first or second supporting member is arranged at a lattice position associated with the first short-length fuel rod, other than the four corners in the outermost peripheral region, the effect of improving the critical power characteristic is not reduced so much even by omitting the projecting members adjacent to the supporting member. That is to say, the omission of the projecting members is more effective in the case where the first or second supporting member is arranged at a lattice position associated with the first short-length fuel rod, other than at the four corners in the outermost peripheral region.

(8) To achieve the above second object, according to the present invention, there is provided a fuel assembly including:

a plurality of fuel-rods arranged in a square lattice array, the fuel rods including a plurality of short-length fuel rods each having a fuel active length shorter than that of each of the remaining ones of the fuel rods;

at least one water rod arranged in a region in which one or more of the fuel rods are arrangeable; and a plurality of fuel spacers, provided at a plurality of positions in the axial direction, for holding the plurality of fuel rods and the at least one water rod with mutual radial intervals thereof kept immovable;

wherein the plurality of short-length fuel rods include at least one first short-length fuel rod arranged in the outermost peripheral region of the square lattice array, and at least one second short-length fuel rod arranged at a lattice position adjacent to the at least one water rod;

each of the plurality of fuel spacers includes a plurality of cylindrical members which are connected to each other and in which the fuel rods are to be inserted respectively, and first loop-shaped springs each of which is provided at a joined portion between a pair of the adjacent ones of the plurality of cylindrical members for pressing two of the fuel rods inserted in the adjacent cylindrical members;

the plurality of fuel spacers include first fuel spacers positioned above the upper ends of the first and second short-length fuel rods, and at least one of the first fuel spacers is configured such that those of the plurality of cylindrical members located at first and second lattice positions associated with the first and second short-length fuel rods are omitted;

each of those of the plurality of cylindrical members located at lattice positions adjacent to the second lattice position has on the second lattice position side a second loop-shaped spring for pressing the fuel rod in the cylindrical member; and the plurality of second loop-shaped springs located at the lattice positions adjacent to the second lattice position are supported by a spring pressing member provided at the second lattice position.

In the at least one first fuel spacer positioned above the upper ends of the first and second shortlength fuel rods, the pressure loss can be reduced by omitting the unnecessary cylindrical members located at the first and second lattice positions.

As a result of removal of the cylindrical members located at the first and second lattice positions in the first fuel spacer, there may be a requirement for reviewing the arrangement of the loop-shaped springs over the fuel spacer. In this case, there may be often provided a second loop-shaped spring of the same kind as that of the first loop-shaped spring on the second lattice side of each of a plurality of the cylindrical members located at lattice positions adjacent to the second lattice position for pressing the fuel rod in the cylindrical member.

Incidentally, the loop-shaped spring is generally configured such that it does not generate any pressing force in the state in which the fuel rods are not inserted in the adjacent cylindrical members between which the loop-shaped spring is mounted. In this regard, each of the plurality of second loop-shaped springs is freely movable on the second lattice position side because no fuel rod is present at the second lattice position, and therefore, it does not generate any pressing force. To cope with such an inconvenience, according to the present invention, the spring pressing member is provided at the second lattice position. The spring pressing member supports the plurality of free second loop-shaped springs in such a manner that the second loop-shaped springs generate pressing forces applied to the associated fuel rods.

(9) In the configuration of the invention described in section (8), preferably, the spring pressing member in the at least one first fuel spacer includes a plurality of spring holding portions which are inserted in the loops of the plurality of second loop-shaped springs for holding the plurality of second loop-shaped springs respectively; and a plurality of spring pressing portions which are brought in contact with the loops of the plurality of second loop shaped springs from the outer peripheral side for supporting the plurality of second loop-shaped springs such that the plurality of second loop-shaped springs generate pressing forces applied to the associated ones of the fuel rods respectively.

(10) In the configuration of the invention described in section (9), preferably, the plurality of spring holding portions include a plurality of spring holding projecting pieces and the plurality of spring pressing portions include a plurality of spring pressing projecting pieces; and the plurality of spring holding projecting pieces all project in one direction, and at least one of the plurality of spring pressing projecting pieces projects in the opposite direction.

The spring holding projecting pieces and the spring pressing projecting pieces of the spring pressing member are generally formed by cutting the base plate portion of the spring pressing member into tongue shapes. The spring pressing projecting pieces are brought in contact with the loops of the second loop-shaped springs from the outer peripheral side, so that the spring pressing projecting pieces are required to project on the inner side of the spring pressing member more than the spring holding projecting pieces inserted in the loops of the loop-shaped springs. Accordingly, if the projecting direction of all of the spring pressing projecting pieces is made identical to the projecting direction of the spring-holding projecting pieces, the cut-in amount along both the sides of each of the spring pressing projecting pieces must be made larger, and correspondingly, the width of a portion, which is equivalent to the non-cut root portion of the spring pressing projecting piece, of the spring pressing member becomes smaller. This makes it difficult to ensure sufficient strength and rigidity against the pressing forces of the second loop-shaped springs.

To cope with such a problem, according to the present invention, the projecting direction of at least one of the spring pressing projecting pieces is opposed to the projecting direction of the spring holding projecting pieces. This is effective to solve such a problem and to ensure sufficient strength and rigidity.

(11) In the configuration of the invention described in section (9), preferably, the plurality of spring holding portions include a plurality of spring holding projecting pieces and the plurality of spring pressing portions include a plurality of spring pressing projecting pieces; and at least one of the plurality of spring pressing projecting pieces is configured such that the leading end thereof is connected to a portion, which is opposed to the leading end of the spring pressing projecting piece, of a base plate portion of the spring pressing member.

Since at least one of the spring pressing projecting pieces is configured such that the root portion and leading end thereof are integrated with the base plate portion, it is possible to ensure sufficient strength and rigidity against the pressing forces of the second loop-shaped springs.

(12) In the configuration of the invention described in section (8), preferably, the at least one first fuel spacer further includes a water rod holding member for holding the at least one water rod in the radial direction; and the spring pressing member is joined to the water rod holding member. The joined body composed of the spring pressing member and the water rod holding member can support the second loop-shaped springs so as to be free on the second lattice position side such that the second loop-shaped springs generate pressing forces applied to the fuel rods, and also it can hold the at least one water rod in the radial direction.

(13) In the configuration of the invention described in section (8), preferably, the spring pressing member of the at least one first fuel spacer serves as a water rod holding member for holding the at least one water rod in the radial direction.

(14) In the configuration of the invention described in section (8), preferably, the plurality of second loop-shaped springs are provided on the second lattice sides of two of the plurality of cylindrical members, positioned adjacent to each other on the second lattice in the row direction and column direction.

(15) To achieve the above second object, according to the present invention, there is also provided a fuel assembly including:

a plurality of fuel rods arranged in a square lattice array of 9 rows×9 columns, the fuel rods including a plurality of short-length fuel rods each having a fuel active length shorter than that of each of the remaining ones of the fuel rods;

two water rods arranged in a region within an array of 3 rows×3 columns of the square lattice array, in which region seven pieces of the fuel rods are arrangeable; and a plurality of fuel spacers, provided at a plurality of positions in the axial direction, for holding the plurality of fuel rods and the water rods with mutual radial intervals kept immovable;

wherein the plurality of short-length fuel rods include four first short-length fuel rods each being arranged at the midpoint on each side of a square shape formed by the outermost peripheral region of the square lattice array, and two second short-length fuel rods arranged in a region of the array of 3 rows×3 columns except for the region in which the two water rods are arranged;

each of the plurality of fuel spacers includes a plurality of cylindrical members which are connected to each other and in which the fuel rods are to be inserted respectively, and first loop-shaped springs each of which is provided at a joined portion between a pair of the adjacent ones of the plurality of cylindrical members for pressing two of the fuel rods inserted in adjacent cylindrical members;

the plurality of fuel spacers include first fuel spacers positioned above the upper ends of the first and second short-length fuel rods, and at least one of the first fuel spacers is configured such that four of the cylindrical members located at four first lattice positions associated with the four first short-length fuel rods and two of the cylindrical members located at two second lattice positions associated with the two second short-length fuel rods are omitted;

each of two of the plurality of cylindrical members, located at lattice positions adjacent to each of the second lattice positions in the row direction and column direction, has on the second lattice position side a second loop-shaped spring for pressing the fuel rod in the cylindrical member; and the two second loop-shaped springs located at the two lattice positions adjacent to the second lattice position are supported by a spring pressing member provided at the second lattice position.

(16) In the configuration of the invention described in section (15), preferably, the spring pressing member has at least one second projecting member which projects outward from the outer peripheral side of the spring pressing member for introducing the flow of a coolant in the projecting direction of the second projecting member.

The spring pressing member at the second lattice position, which is at a level at which no fuel rod is present, is not required to be cooled. Accordingly, to direct the flow of a coolant passing through the spring pressing member toward the other fuel rods around the lattice position as much as possible, the second projecting members are provided on the spring pressing member. This makes effective use of the coolant and hence improves the effect of cooling the fuel rods.

DETAILED DESCRIPTION OF THE PREFERRED EMBODIMENTS

Hereinafter, embodiments of the present invention will be described with reference to the drawings.

First Embodiment

A first embodiment of the present invention will be described with reference to FIGS. 1 to 6. A vertical sectional view showing the structure of a fuel assembly in this embodiment is shown in FIG. 2, and a transverse sectional view taken on line A—A of FIG. 2 is shown in FIG. 3.

Figure 2:
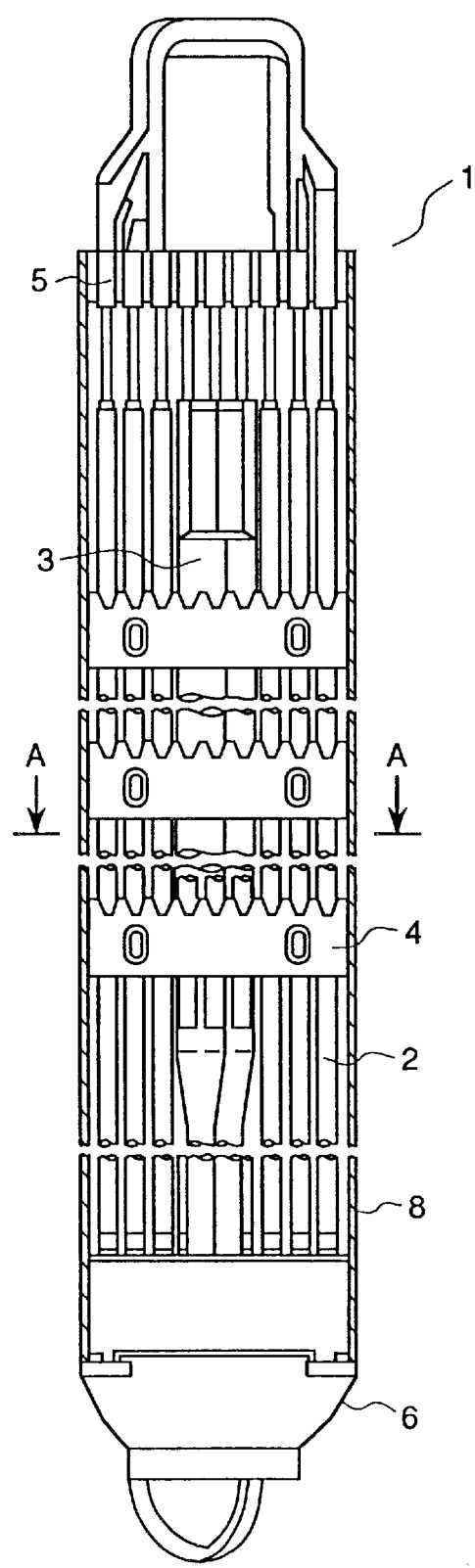
FIG. 2 is a vertical sectional view showing the structure of the fuel assembly to which the fuel spacer shown in FIG. 1 is applied.
Figure 3:
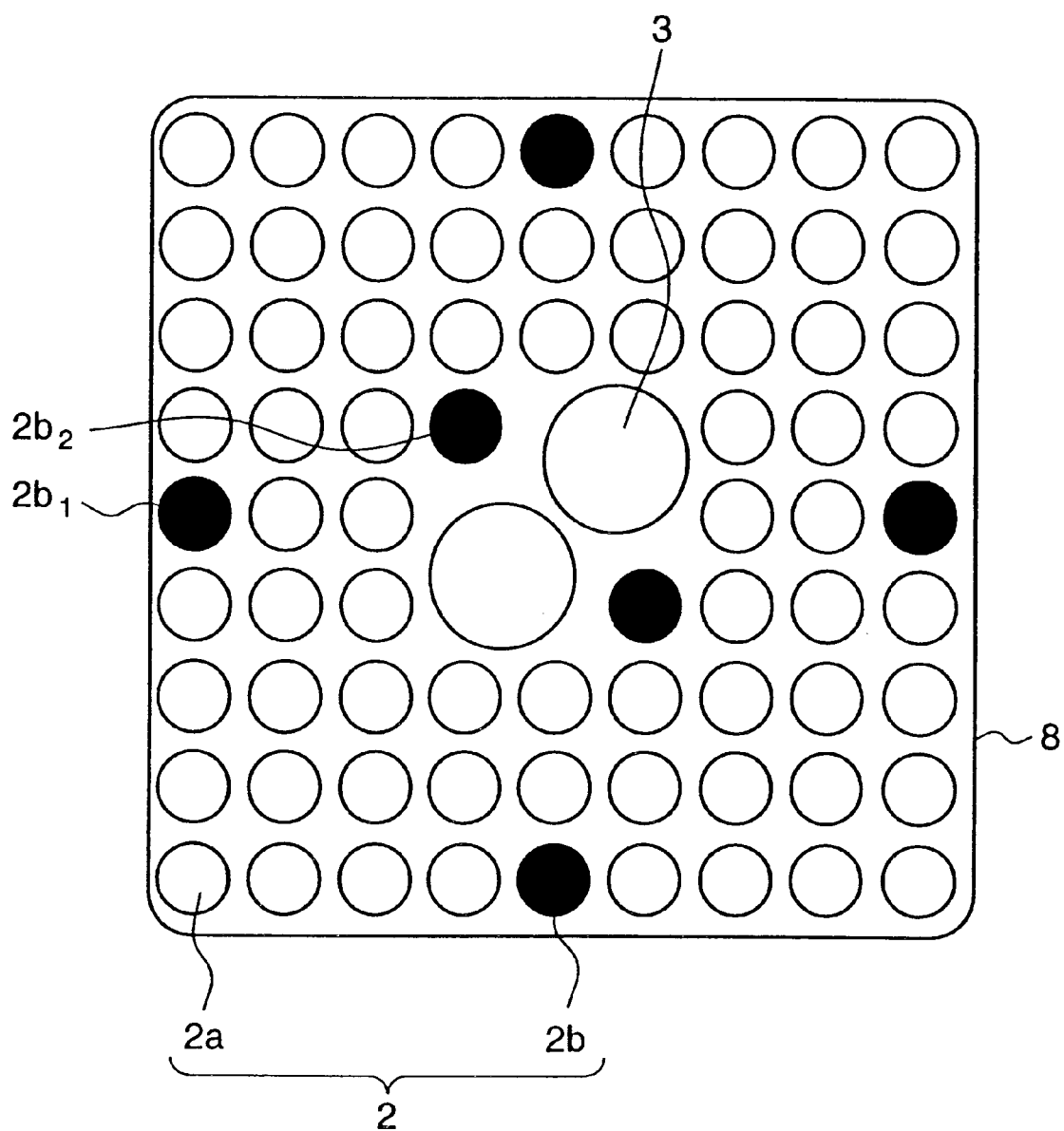
FIG. 3 is a transverse sectional view taken on line A—A of FIG. 2.

Referring to FIGS. 2 and 3, a fuel assembly 1 includes 74 fuel rods 2, filled with fuel pellets (not shown), which fuel rods are arranged in a square lattice array of 9 rows×9 columns; two water rods 3 arranged in a region in which seven of the fuel rods 2 are arrangeable; fuel spacers 4 for holding the fuel rods 2 and the water rods 3 with mutual radial intervals thereof kept immovable; an upper tie plate 5 and a lower tie plate 6 for holding the upper end portion and the lower end portion of a fuel bundle composed of the fuel rods 2 and the water rods 3, respectively; and a fuel channel box 8 for covering the outer peripheral portion of the above structure.

The fuel rods 2 include normal-length fuel rods 2a, each having a normal fuel active length (filling length of fuel pellets), and short-length fuel rods 2b each having an effective length shorter than that of the normal-length fuel rods 2a. The short-length fuel rods 2b include four first short-length fuel rods 2b1 arranged in the outermost peripheral region of the square lattice array, and two second short-length fuel rods 2b2 arranged in a region adjacent to the water rods 3.

The fuel spacers 4 are provided at a plurality of positions arranged in the axial direction. As shown in FIG. 3, there are 74 fuel rods 2, including the short-length fuel rods 2b, which are short in fuel active length and accordingly, the lattice positions, which are filled with the shortlength fuel rods 2*b* in the fuel spacer 4*a* positioned on the lower portion of the fuel assembly 1, become empty of fuel rods in the fuel spacer 4*b* positioned on the upper portion of the fuel assembly 1. For this reason, the structure of the fuel spacer 4*b* positioned above the upper ends of the short-length fuel rods 2*b* is designed to be slightly different from the structure of the fuel spacer 4*a* positioned below the upper ends of the short-length fuel rods 2*b*. Top views of the structures of these fuel spacers 4*a* and 4*b* are shown in FIGS. 4 and 1, respectively.

Figure 1:
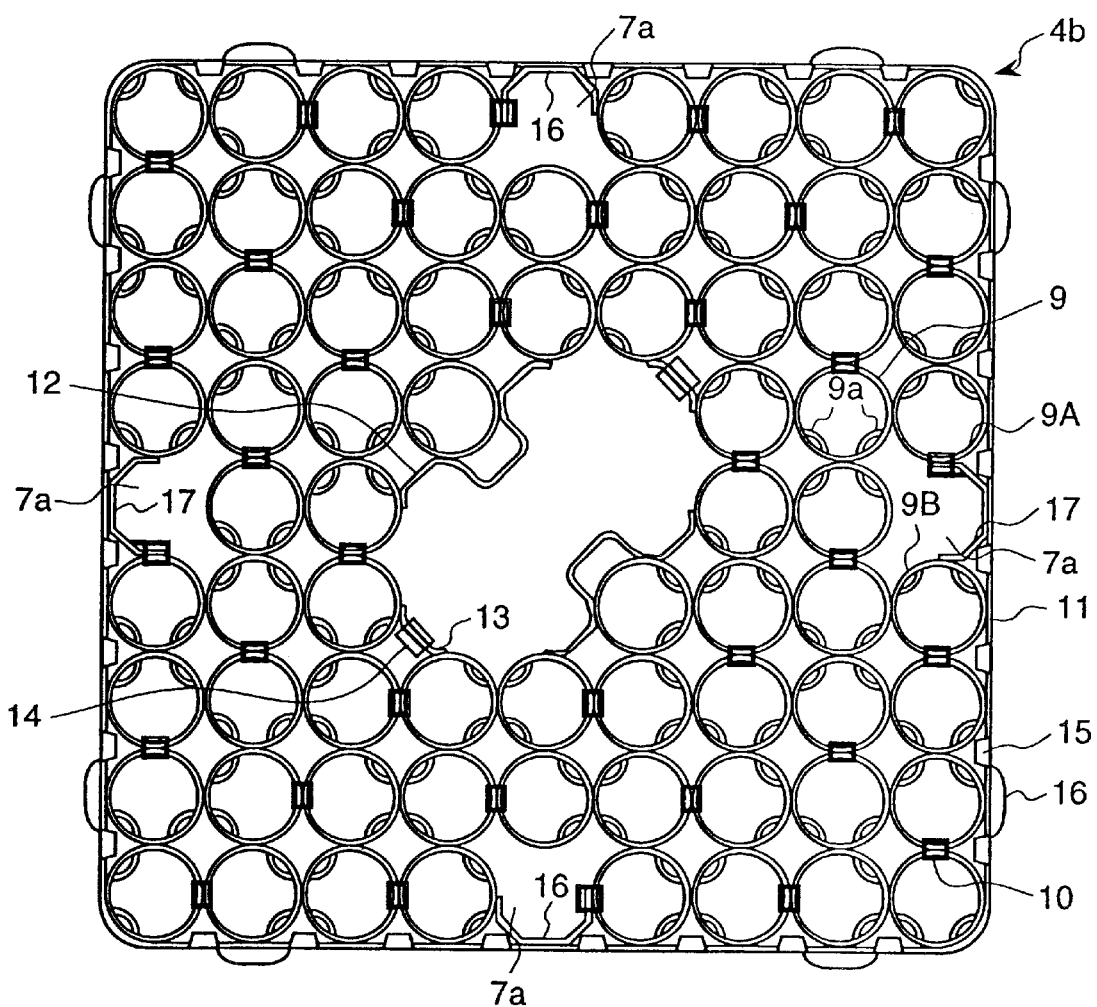
FIG. 1 is a top view showing the structure of a fuel spacer positioned upward from the upper ends of short-length fuel rods in a fuel assembly according to a first embodiment of the present invention.
Figure 4:
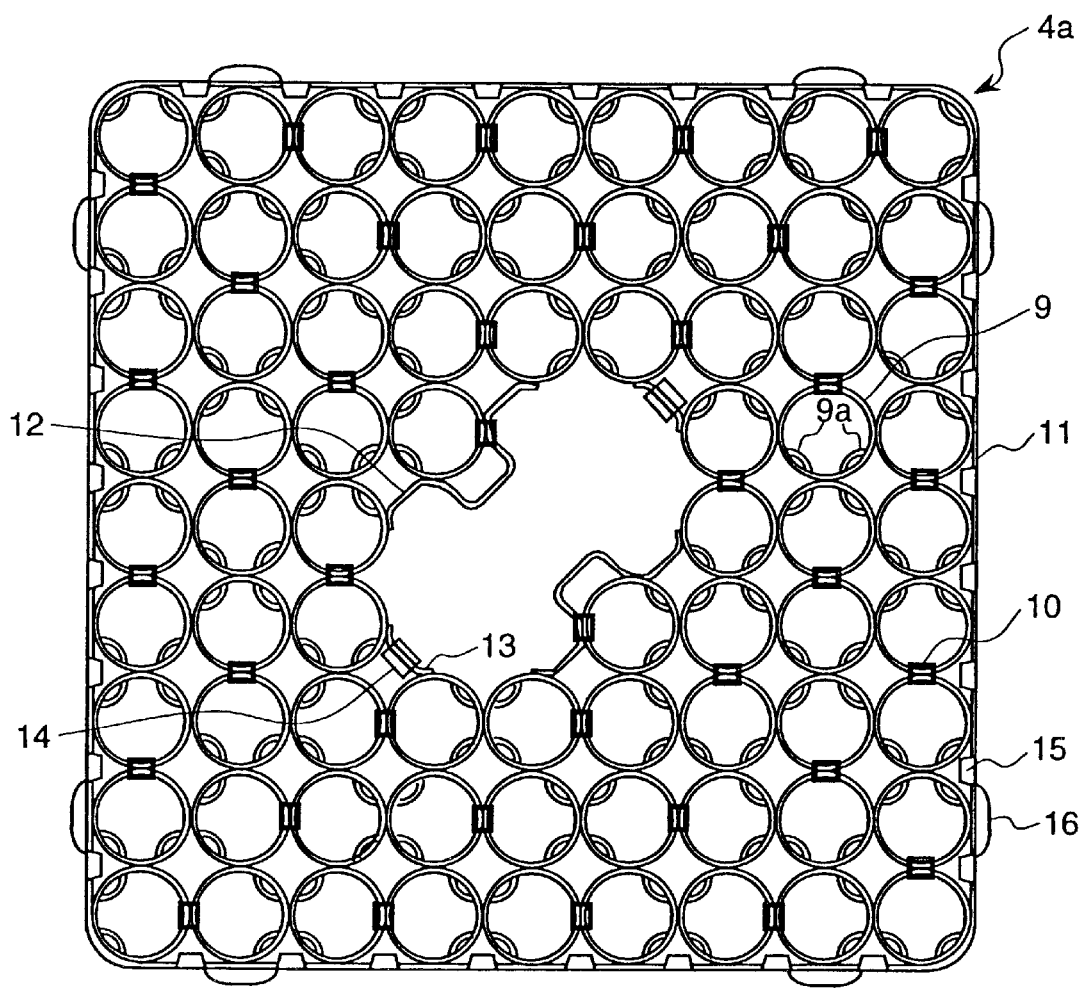
FIG. 4 is a top view showing the structure of a fuel spacer positioned downward from the upper ends of the short-length length fuel rods, which structure is applied to the fuel assembly according to the first embodiment.

Referring to FIGS. 4 and 1, each of the fuel spacers 4*a* and 4*b* includes a large number (74 cells for the spacer 4*a*, 70 cells for the spacer 4*b*) of cylindrical members (cells) 9 which are arranged in a square lattice array of 9 rows x 9 columns corresponding to the square lattice array of the fuel rods 2, and these cylindrical members are welded to each other and are of a size to permit the fuel rods 2 to be inserted therein, respectively; a square-shaped band member (band) 11 which surrounds the outer periphery of the joined cells 9; water rod holding members 12, each being formed into a Ω-shape in transverse cross-section, which are welded to those cells, which are arranged in the innermost peripheral region of the square lattice array, of the cells 9, for holding the water rods 3 in the radial and axial directions; approximately quarter-round water rod holding members 13; and water rod holding springs 14, provided on the water rod holding members 13, for imparting pressing forces to hold the water rods 3 in position.

Each cell 9, which is formed into an approximately cylindrical shape, includes two projections 9*a* for holding a respective fuel rod 2; and a spring supporting portion (not shown), provided at the joined portion with the adjacent cell 9, for suitably supporting a loop-shaped spring 10 to press against the fuel rod 2 inserted in the cell 9. It should be noted that the structures of the loop-shaped spring and the spring supporting portion, while not shown particularly in detail in the figures, are known for example from Japanese Patent Laid-open No. Hei 6-273560.

The band 11, having a square-shape, whose four sides are welded to each other, includes a large number of flow tabs 15 each of which is bent in such a manner as to project between the adjacent ones of the cells 9 in the outermost peripheral region of the square lattice array in order to introduce the flow of a coolant; and eight bathtubs 16 provided two for each side of the square-shape of the band 11, each tub projecting on the fuel channel box 8 side so as to be brought in contact with the inner surface of the fuel channel box 8.

The feature of this embodiment lies in the structure of the fuel spacer 4*b*. That is to say, the fuel spacer 4*b* shown in FIG. 1 is different from the fuel spacer 4*a* shown in FIG. 4 in that the cells 9 located at first lattice positions 7*a* associated with the first short-length fuel rods 2*b*1 are omitted and instead the supporting members 17 are provided at the lattice positions 7*a*. The supporting member 17 connects the two cells 9A and 9B, adjacently located on both the sides of the first lattice position 7*a* associated with the first short-length fuel rod 2*b*1 in the outer peripheral region of the square lattice array, to the band 11.

Figure 5:
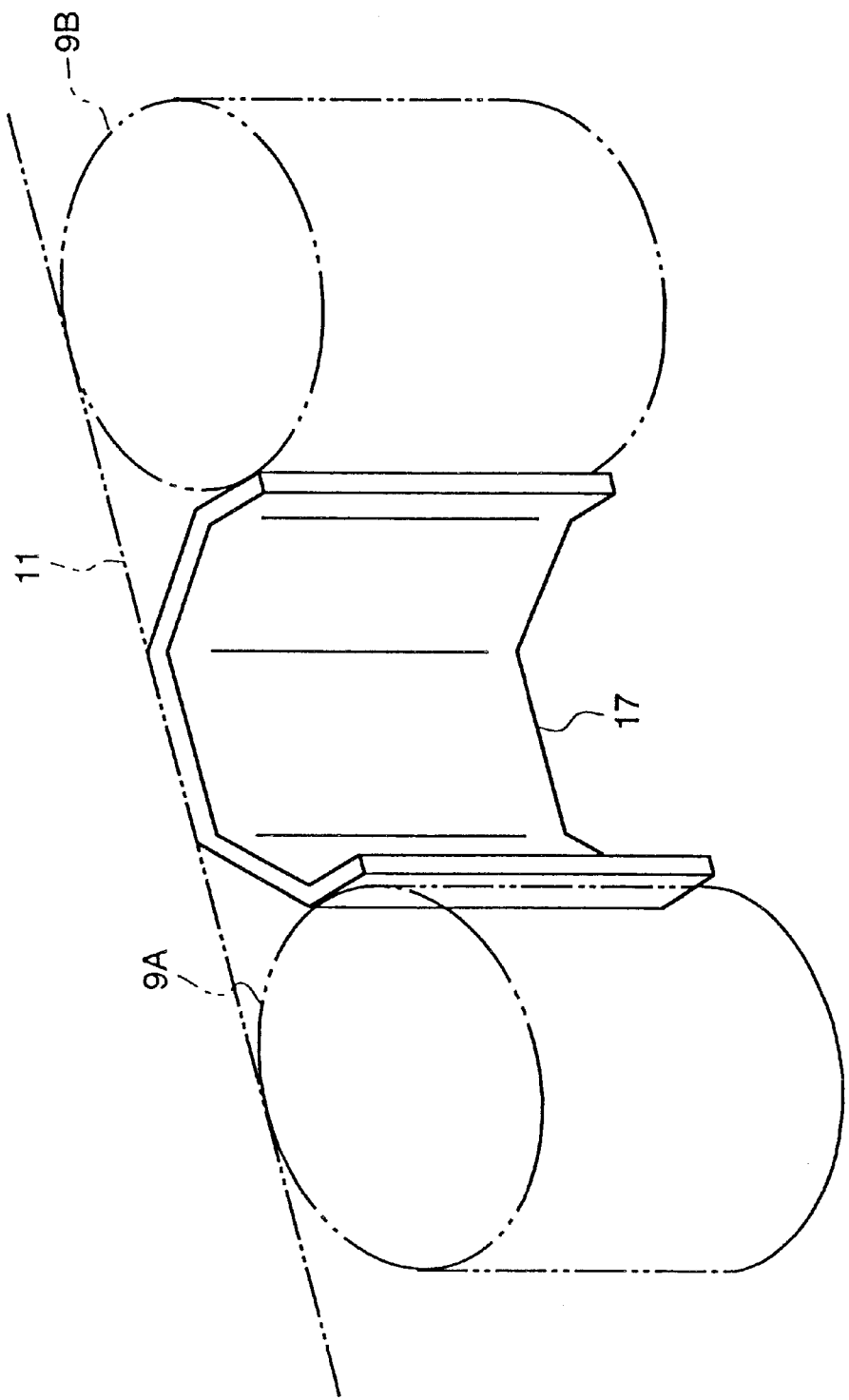
FIG. 5 is a perspective view showing the structure of a supporting member in the fuel spacer shown in FIG. 1.

FIG. 5 is a perspective view showing the structure of the supporting member 17. Referring to FIG. 5, the supporting member 17 is formed into a shape similar to one of two halves obtained by vertically dividing a cylinder having an octagonal cross-section. While not shown in FIG. 5 to avoid complication in the drawing, as shown in FIG. 1, the supporting member 17 includes, at the joined portion with the adjacent cell 9A, a spring supporting portion for suitably supporting the loop-shaped spring 10, which operates to hold the fuel rod 2 inserted in the cell 9A by imparting a pressing force against the fuel rod 2. It should be noted that the structure of the spring supporting portion, while not shown particularly in detail in the figures, is known for example from Japanese Patent Laid-open No. Hei 2-163695.

In the fuel spacer 4*b*, the cells 9 located at the lattice positions associated with the second short-length fuel rods 2*b*2 are left as they are; however, the loop-shaped springs 10, which are unnecessary for the cells 9, because the fuel rods are not inserted in the cells 9, are removed from the cells 9.

The fuel assembly in this embodiment, which is configured as described above, exhibits the following effects:

(1) Reduction in Pressure Loss

This effect will be described with reference to a comparative example in which a fuel spacer having the same structure as that of the fuel spacer 4*a*, in which all of the cells 9 are located without any being omitted at all of the lattice positions, as shown in FIG. 4, is positioned above the upper ends of the first short-length fuel rods 2*b*1 of the fuel assembly 1. In this comparative example, the cells 9, which are not required to be provided at the lattice positions associated with the first short-length fuel rods 2*b*1 because the fuel rods are not present at the lattice positions, are provided at the lattice positions, and therefore, the pressure loss is correspondingly increased.

On the contrary, in the fuel spacer 4*b* in this embodiment, the cells 9 at the first lattice positions 7*a* associated with the first short-length fuel rods 2*b*1 are omitted, and instead the supporting members 17 each being formed into a semi-octagonal cross-sectional shape, are provided at the first lattice positions 7*a*, as shown in FIG. 1. As a result, since the flow resistance of water as a coolant flowing upward in the fuel assembly 1 is made significantly smaller than that in the comparative example, it is possible to sufficiently reduce the pressure loss.

(2) Attainment of Structural Strength

This effect will be described in detail with reference to the above-described comparative example. As described above, in the fuel spacer (having the same structure as that of the fuel spacer 4*a* shown in FIG. 4) in the comparative example, all of the cells 9 in contact with the band 11 surrounding the outer periphery of the spacer are continuously in contact with each other, to thereby maintain the structural strength of the entire spacer.

For example, if an external force is applied to the fuel spacer via the fuel channel box 8 in case of an earthquake or in handling the fuel assembly, the load is first transmitted to eight of the bath-tubs 16 provided on the band 11. After that, the load is transmitted, via the band 11, to the cells 9 in the outermost peripheral region of the square lattice array joined to the inner side of the band 11, and then the force is sequentially transmitted to the cells 9 arranged on the inner peripheral side of the square lattice array (see FIG. 4). In this way, for the fuel spacer in this comparative example, since the cells 9 arranged in succession in the path along which the load is transmitted are integrally formed and an integrity of ensuring the structural effect as a whole is obtained, it is possible to sufficiently ensure the structural strength of the entire fuel spacer.

On the contrary, for the fuel spacer 4*b* in this embodiment, as shown in FIG. 1, since one cell 9 between the cells 9A and 9B at each side of the square lattice array is omitted, the arrangement of the cells 9 in the outermost peripheral region becomes discontinuous at the position between the cells 9A and 9B. In this embodiment, however, since the two cells 9A and 9B are joined to each other by means of the supporting member 17, the cells 9A and 9B are rigidly fixed to each other via the band 11. As a result, when a load is transmitted from the band 11 as described above, it can be received by the joined structure composed of the fixed two cells 9A and 9B and the supporting member 17, and accordingly, it is possible for the fuel spacer 4b to provide a structural strength substantially comparable to that of the fuel spacer in the comparative example in which a cell 9 is located at the lattice position between the cells 9A and 9B.

(3) Attainment of Degree of Freedom in Design of Short-length Fuel Rod Arrangement As described in the paragraphs (1) and (2), the fuel spacer 4b in this embodiment is effective to reduce the pressure loss while ensuring the structural strength of the entire spacer. Such an effect can be obtained even if the lattice position associated with the first short-length fuel rod 2b1 is located at any position in the outermost peripheral region of the square lattice array. In other words, according to this embodiment, it is possible to ensure the degree of freedom in design.

In the design of a fuel assembly including short-length fuel rods, as described above, various arrangements of the short-length fuel rods may be considered in accordance with the nuclear characteristics required for the fuel assembly. Therefore, for example, there may be considered an arrangement of the first short-length fuel rod 2b1 at a position between the two opposed bath-tubs 16 in the outermost peripheral region of the square lattice array.

In this case, for example, in the fuel space having the prior art structure disclosed in Japanese Patent Laid-open No. Hei 6-3473, since the cells 9 at all of the lattice positions between the two opposed bath-tubs 16 cannot be omitted, the pressure loss cannot be sufficiently reduced. On the other hand, if the reduction in pressure loss takes precedence, the short-length fuel rods cannot be arranged at all of the lattice positions between the two opposed bath-tubs 16, and therefore, the degree of freedom in design of the fuel assembly is correspondingly limited.

Figure 6:
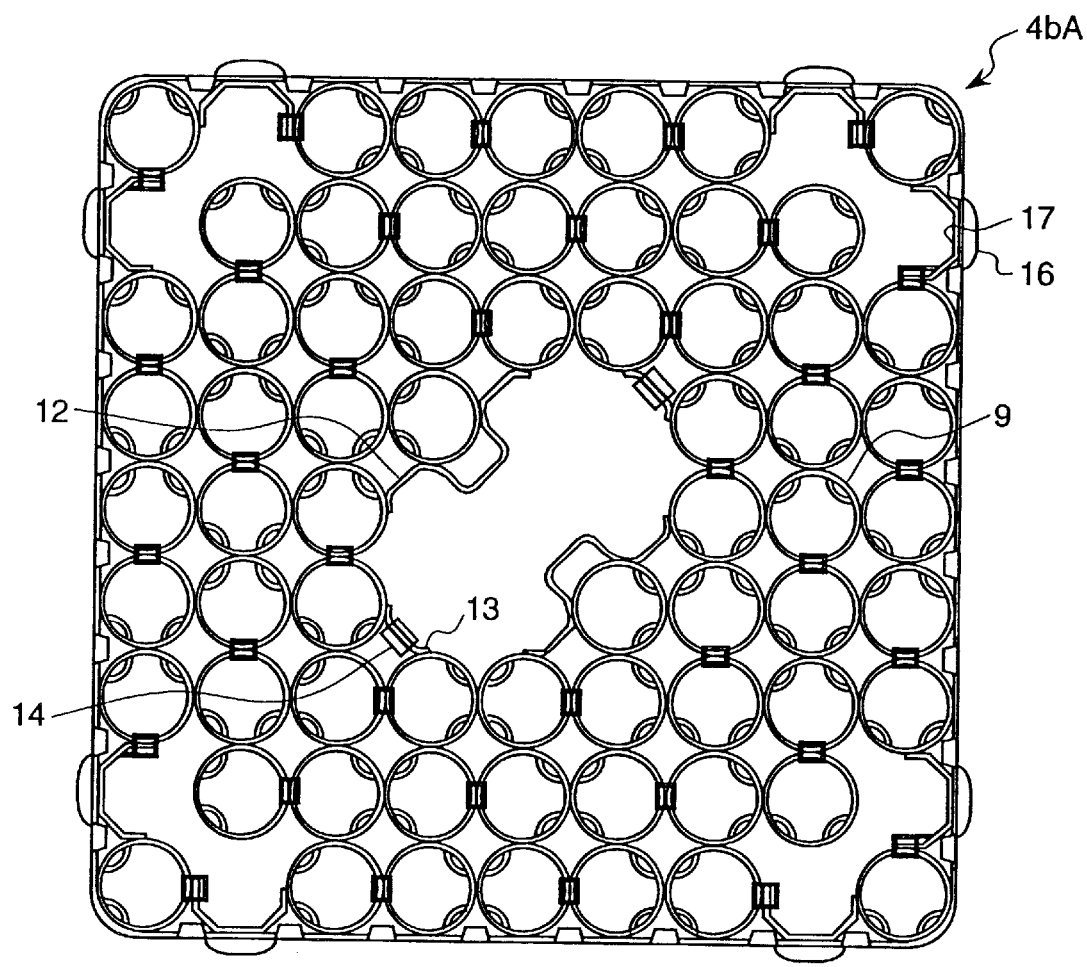
FIG. 6 is a top view showing a modification of the fuel spacer shown in FIG. 1, in which lattice positions associated with the first short-length fuel rods are located between two opposed bath-tubs.

On the contrary, in such a case, the fuel spacer 4b in this embodiment can be modified, in accordance with the arrangement of the lattice positions associated with the first short-length fuel rods 2b1, for example, into a fuel spacer 4bA shown in FIG. 6 in which the cells 9 located at the lattice positions between the two opposed bath-tubs 16 are omitted and instead the supporting members 17 are provided at those lattice positions. Accordingly, unlike the fuel spacer having the prior art structure, even if the lattice positions associated with the first short-length fuel rods 2b1 are located between the two opposed bath-tubs 16 in the outermost peripheral region of the square lattice array, it is possible to sufficiently reduce the pressure loss while ensuring the strength of the fuel spacer.

As described in the paragraphs (1) to (3), according to the fuel spacer 4b in this embodiment, it is possible to sufficiently reduce the pressure loss of the fuel spacer 4b positioned upward from the upper ends of the short-length fuel rods 2b1 while usually ensuring the structural strength of the fuel spacer 4b irrespective of the arrangement of the lattice positions associated with the first short-length fuel rods 2b1.

(4) Attainment of Degree of Freedom in Design of Spring Arrangement

As described above, the known loop-shaped spring 10 for pressing the fuel rods 2 is essentially disposed between the adjacent cells 9, and it functions to generate pressing forces when the fuel rods 2 are inserted in the cells 9, respectively. Accordingly, if the means for imparting a spring pressing force is not provided on the supporting member 17, which is additionally provided at the lattice position associated with the first short-length fuel rod 2b1, the supporting member 17 side of the loop-shaped spring 10 disposed at the joined portion between the supporting member 17 and the adjacent cell 9A comes into a free end, with a result that the loop-shaped spring 10 cannot achieve the function of pressing against the fuel rod 2 inserted in the cell 9A.

Accordingly, to press the fuel rod 2 in the cell 9A, the loop-shaped spring 10 must be disposed between the cell 9A and the cell 9 which is adjacent to a portion, opposed to the supporting member 17, of the cell 9A. As a result, the spring arrangement in the entire spacer must be reviewed as a whole. This imposes a large limitation on the design.

In this embodiment, however, the spring supporting portion provided on the supporting member 17 supports the loop-shaped spring 10 for pressing the fuel rods 2 and imparts a pressing force to the loop-shaped spring 10. As a result, since the loop-shaped spring 10 in the cell 9A is allowed to function just as in the fuel spacer 4a shown in FIG. 4, it is possible to increase the degree of freedom in arrangement of the loop-shaped springs 10 and hence to ensure a degree of freedom of design comparable to that in the fuel spacer 4a shown in FIG. 4.

Second Embodiment

A second embodiment of the present invention will be described with reference to FIGS. 7 to 11). This embodiment has a feature such that, in the fuel spacer positioned above the upper ends of the first short-length fuel rods 2b1, the spring arrangement and the shape of the supporting member are changed.

Figure 7:
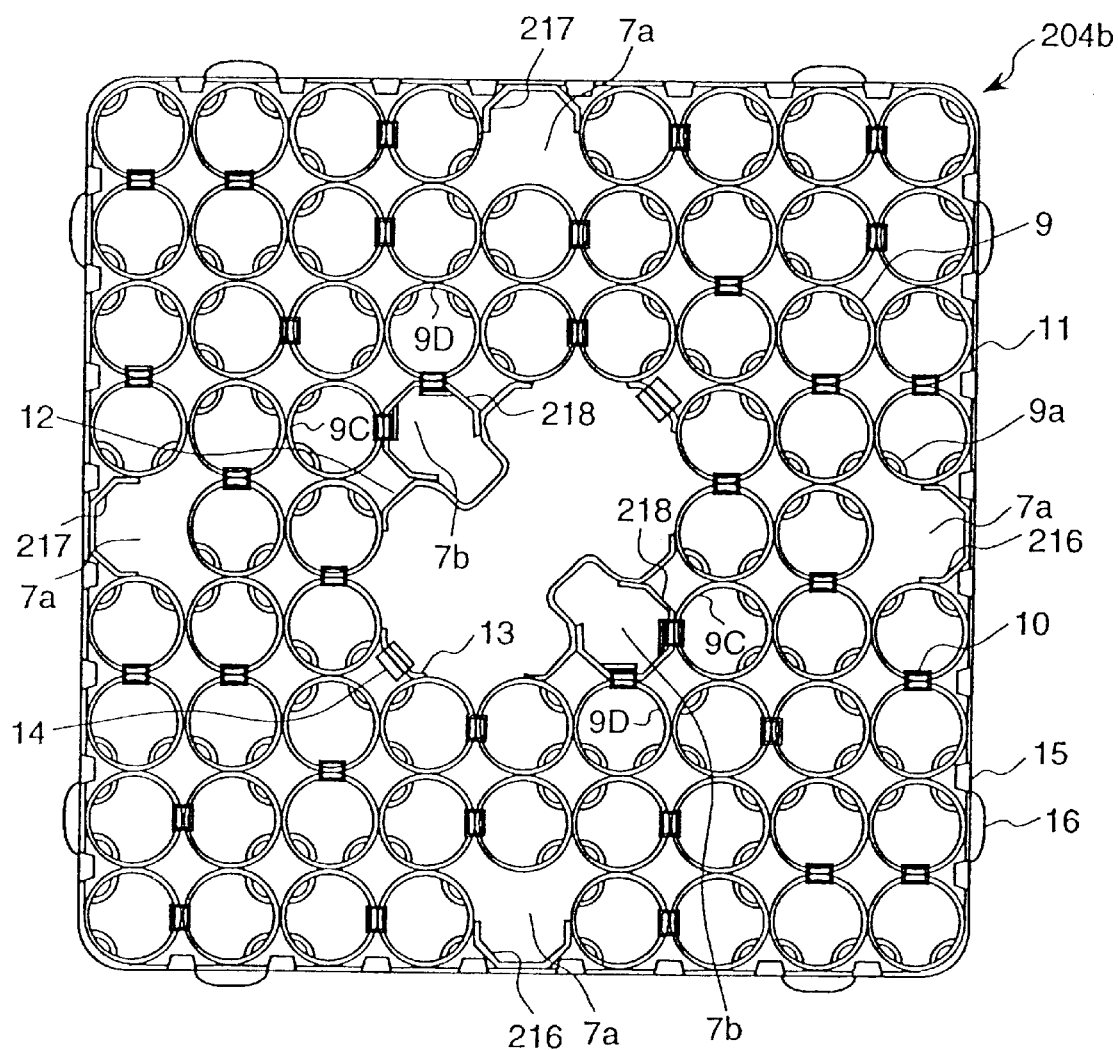
FIG. 7 is a top view showing the structure of a fuel spacer according to a second embodiment of the present invention.

FIG. 7 is a top view showing the structure of a fuel spacer 204b in this embodiment. In the fuel spacer 204b, parts common to those in the fuel spacer 4b described in the first embodiment with reference to FIG. 1 are designated by the same symbols and an explanation thereof will be omitted.

The fuel spacer 204b shown in FIG. 7 is different from the fuel spacer 4b shown in FIG. 1 in that the cells 9 at the second lattice positions 7b associated with the second short-length fuel rods 2b2 are omitted and instead supporting members 218 are provided at the second lattice positions 7b. The supporting member 218 connects the two cells 9C and 9D, located outwardly from and adjacently to the second lattice position 7b in the square lattice array, to the water rod holding member 12. The supporting member 218 is formed into an approximately polygonal cylindrical shape with an unnecessary side portion in terms of structure cut off for making the pressure loss as small as possible.

In the fuel spacer 204b, a supporting member 217, having a structure in which the spring supporting portion is removed from the supporting member 17 shown in FIG. 1, is used as a supporting member for connecting the two cells 9A and 9B adjacently located on both sides of the lattice position associated with the first short-length fuel rod 2b1, to the band 11. With this configuration, since a loop-shaped spring 10 is not disposed on the supporting member 217, the spring arrangement in the entire fuel spacer is changed such that the supporting member 218 has two spring supporting portions (not shown) for suitably supporting the two loop-shaped springs 10 to press against the fuel rods 2 inserted in the cells 9C and 9D to impart pressing forces thereto. To be more specific, two of the known spring supporting portions having the same structure as that of the spring supporting portions used for the cells 9 are simply provided at a joined portion between the cells 9C and 9D of the supporting member 218. The remaining configuration of this embodiment is substantially the same as that of the first embodiment.

According to this embodiment, in addition to the same effect as that of the first embodiment, there can be obtained an effect of simplifying the structure because the supporting member 217 has no spring supporting portion.

While the supporting member 217 formed into a semi-octagonal cylindrical shape is used in the second embodiment, the present invention is not limited thereto. For example, the supporting member 217 may be formed into another shape, for example, a semi-cylindrical shape (with a partial peripheral length portion cut off) having the same thickness as that of the cell 9. This exhibits the following effect.

In general, the cell 9 is manufactured by cutting a circular tube, having a specific outside diameter and a specific thickness, into a specific length, and processing the cut piece to form the projections 9a. and also cutouts for the spring supporting portion. Here, if a supporting member 217A formed into a semi-cylindrical shape having the same thickness as that of the cell 9 is used as the supporting member, such a supporting member 217A can be manufactured using the raw circular tube for forming the cell 9. This is effective to reduce the manufacturing cost by making the circular tube shareable between the-supporting member 217A and the cell 9. From the viewpoint of reduction in pressure loss, it may be Desirable that the peripheral length of the cylindrical shape of the supporting member 217A be made as short as possible within a length range required for welding the supporting member 217A to the adjacent cells 9 with no problem.

Figure 8:
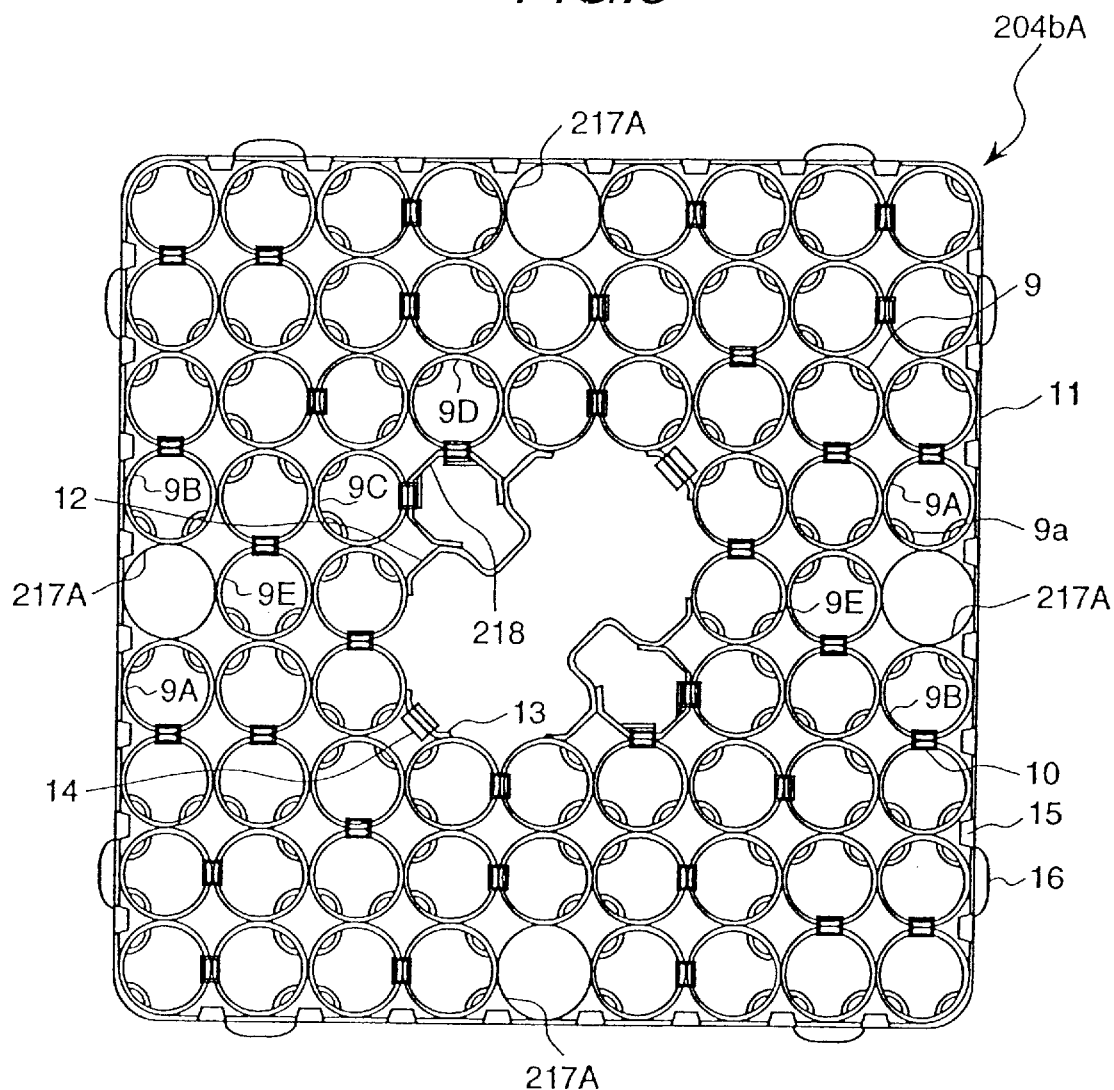
FIG. 8 is a top view showing a modification of the fuel spacer shown in FIG. 7, in which supporting members, each of which is composed of an approximately cylindrical shape similar to that of a cell, are provided.

Further, a supporting member 217A formed into an approximately cylindrical shape similar to that of the cell 9 may be used as the supporting member. FIG. 8 is a top view showing the structure of a fuel spacer 204bA including such a supporting member 217A. The supporting member 217A connects the cells 9A and 9B, adjacently located on both sides of the lattice position 7a associated with the first short-length fuel rod 2b1, to the band 11, and also the supporting member 217A is connected to the cell 9E located inwardly from and adjacently to the first lattice position 7a in the square lattice array.

In addition, the supporting member 217 is made as thin as possible within an allowable thickness range in terms of the structural strength of the fuel spacer for making the cross-sectional area smaller than that of the cell 9 thereby reducing the pressure loss.

The supporting member 217A formed into an approximately cylindrical shape is manufactured using a circular tube having a specific thickness, which tube is different from the raw circular tube for forming the cell 9, or using the raw circular tube for forming the cell 9, and grinding the inner surface of the tube to increase the inside diameter (that is, decrease the thickness). In the latter case, there can be obtained an effect of reducing the manufacturing cost by making the circular tube shareable between the supporting member 217A and the cell 9.

It should be noted that the cross-sectional shape of the supporting member 217A in this modification is not limited to a cylindrical shape, but may be of course a polygonal shape insofar as it satisfies the requirement that the cross-section of the supporting member 217A is smaller than that of the cell 9.

Further, the supporting member 217A may be configured as a member having the same cross-sectional shape as that of the supporting member 218 except that the spring supporting portions for supporting the loop-shaped springs 10 are not provided. In the manufacture of the supporting member 218, the member 217 (replaced from the supporting member 217A) having the same cross-sectional shape as that of the supporting member 218 can be manufactured by punching or bending the same raw material as that for the supporting member 218. This is effective to reduce the manufacturing cost by making the raw material shareable between the member (replaced from the supporting member 217A) and the supporting member 218. In this sharing of the raw material, the shape of the supporting member 218 is not limited to a polygonal cylindrical shape but may be of course a thin cylindrical shape or a cylindrical shape with a partial peripheral portion cut off.

Third Embodiment

Figure 9:
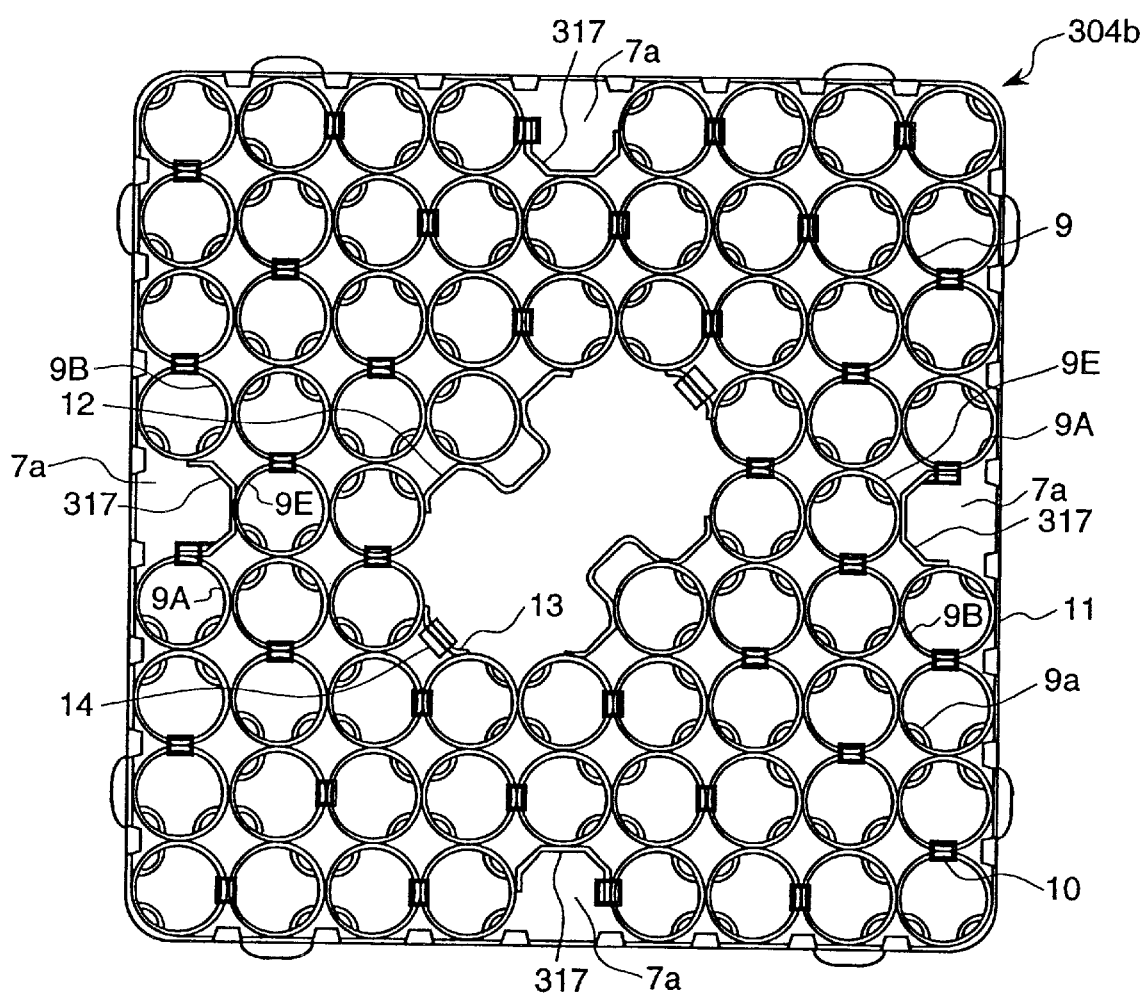
FIG. 9 is a top view showing the structure of a fuel spacer according to a third embodiment of the present invention.

A third embodiment of the present invention will be described with reference to FIGS. 9 to 11. This embodiment has a feature such that, in the fuel spacer positioned above the upper ends of the first short-length fuel rods 2b1, the shape of the supporting member and the supporting structure are further changed. FIG. 9 is a top view showing the structure of a fuel spacer 304b in this embodiment. In the fuel spacer 304b, parts common to those of the fuel spacer 4b described in the first embodiment with reference to FIG. 1 are designated by the same symbols and an explanation thereof will be omitted.

The fuel spacer 304b shown in FIG. 9 is different from the fuel spacer 4b shown in FIG. 1 in that the supporting member 17 located at the first lattice position (see FIG. 3) associated with the first short-length fuel rod 2b1 is replaced with a supporting member 317. The supporting member 317 connects the two cells 9A and 9B adjacently located on both sides of the first lattice position 7a associated with the first short-length fuel rod 2b1 in the outermost, peripheral region of the square lattice array, and the cell 9E located inwardly from and adjacently to the first lattice position 7a in the square lattice array, to each other. In summary, the supporting member 317, which is not joined to the band 11, joins the adjacent cells 9A, 9B and 9E to each other.

With this configuration, the entire fuel spacer has a structure as shown in FIG. 9 in which each cell 9 in the second layer from the outermost periphery of the square lattice array is fixedly joined to four adjacent cells or three adjacent cells and one supporting member 317 at four positions spaced at intervals of 90° in the circumferential direction thereof. Like the supporting member 17 in the first embodiment, the supporting member 317 is formed into one of two halves obtained by vertically dividing a cylinder having an octagonal cross-section. While not shown in detail, like the supporting member 17, the supporting member 317 includes, at the joined portion with the adjacent cell 9A, a spring supporting portion for suitably supporting a loop-shaped spring 10 to hold the fuel rod 2 inserted in the cell 9A to impart a pressing force thereto. The other configuration is substantially the same as that of the first embodiment.

Like the fuel assembly in the first embodiment, the fuel assembly in this embodiment, configured as described above, has the following four effects:

(1) Reduction in Pressure Loss

In the fuel spacer 304b in this embodiment, the cells 9 at the first lattice positions 7a associated with the first shortlength fuel rods 2b1 are omitted, and instead the supporting members 317 each being formed into a semi-octagonal cross-sectional shape are provided at the first lattice positions 7a. As a result, since the flow resistance of water as a coolant flowing upward in the fuel assembly 1 is significantly reduced, it is possible to sufficiently reduce the pressure loss.

(2) Attainment of Structural Strength In the fuel spacer 304b in this embodiment, as shown in FIG. 9, since one cell 9 between the cells 9A and 9B at each side of the square lattice array is omitted, the arrangement of the cells 9 in the outermost peripheral region becomes discontinuous at the position between the cells 9A and 9B. In this embodiment, however, since the two cells 9A and 9B are connected to the adjacent cell 9E on the inner peripheral side by means of the supporting member 317, the two cells 9A and 9B are rigidly fixed to each other via the cell 9E. As a result, when a load is transmitted from the band 11, it can be received by the joined structure composed of the fixedly connected two cells 9A and 9B, the supporting member 317, and the cell 9E. Accordingly, it is possible for the fuel spacer 304b to provide a structural strength substantially comparable to that of the fuel spacer in which the cell 9 is located at the lattice position between the cells 9A and 9B.

(3) Attainment of Degree of Freedom in Design of Short-length Fuel Rod Arrangement In the fuel spacer 304b in this embodiment, even if the lattice position associated with the first short-length fuel rod 2b1 is located at any position in the outermost peripheral region of the square lattice array, the cell 9 at the lattice position can be omitted and instead the supporting member 317 can be provided at the lattice position. Accordingly, unlike the fuel spacer disclosed for example in Japanese Patent Laid-open No. Hei 6-3473, even if the lattice positions associated with the first short-length fuel rods 2b1 are located between the two opposed bath-tubs 16 in the outer peripheral region of the square lattice array, it is possible to omit the cells 9 at the lattice positions, and hence to sufficiently reduce the pressure loss while ensuring the strength of the fuel spacer.

(4) Attainment of Degree of Freedom in Design of Spring Arrangement

In the fuel spacer 304b in this embodiment, the spring supporting portion provided on the supporting member 317 supports the loop-shaped spring 10 for pressing against the fuel rods 2 to impart a pressing force thereto. Accordingly, it is possible to ensure a degree of freedom in the spring arrangement comparable to that in the fuel spacer in which the cells 9 are located at the first lattice positions 7a associated with the first shortlength fuel rods 2b1.

It should be noted that the third embodiment may be variously modified without departing from the basic configuration thereof. Some modifications will be described below.

Figure 10:
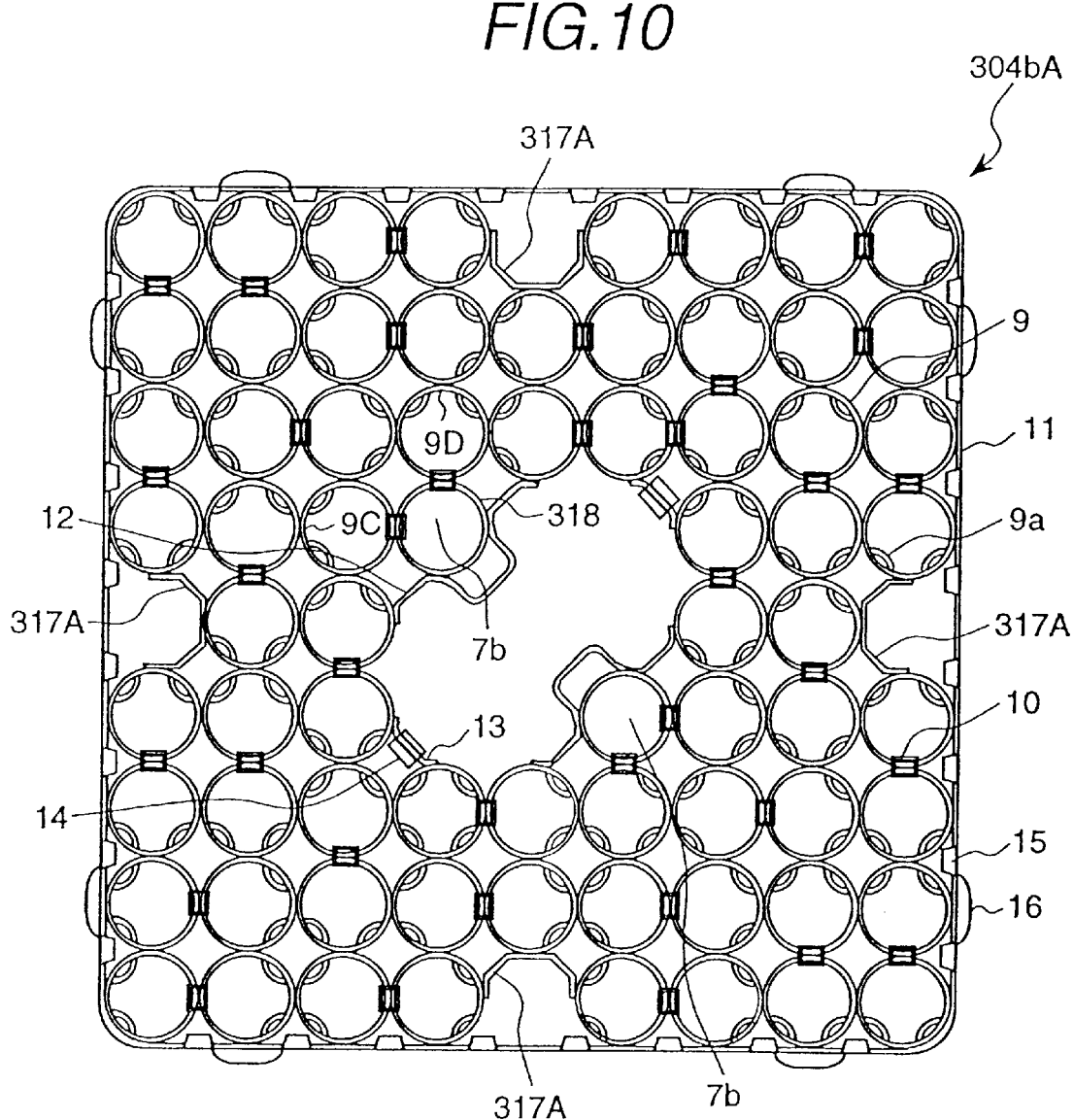
FIG. 10 is a top view showing a modification of the fuel spacer shown in FIG. 9, in which supporting members are provided at lattice positions associated with second short-length fuel rods and spring supporting members are removed from supporting members located at lattice positions associated with first short-length fuel rods.
Figure 11:
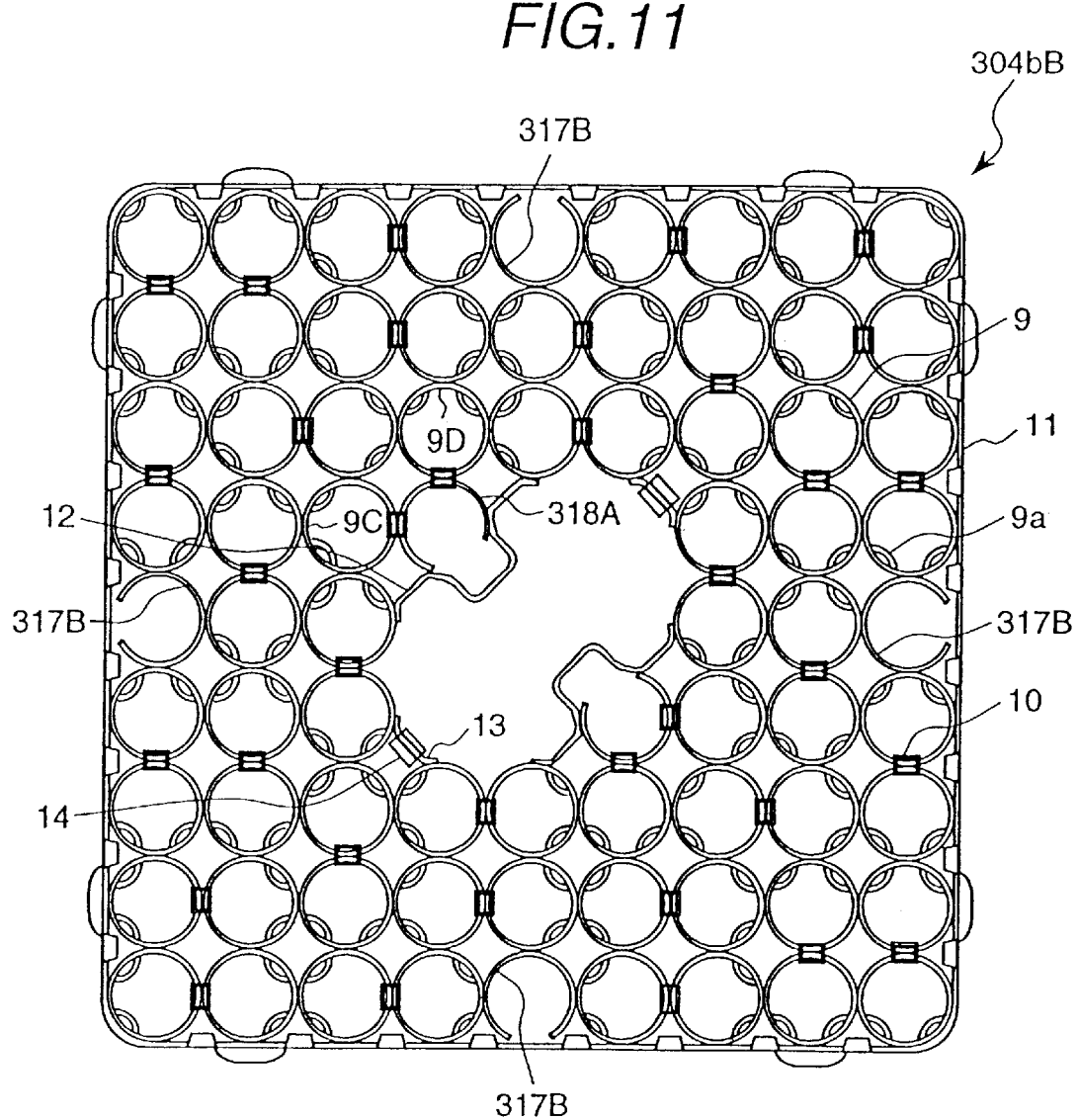
FIG. 11 is a top view showing a modification of the fuel spacer shown in FIG. 9, in which a supporting member connected to a water rod holding plate is formed into a shape similar to that of a supporting member located at a lattice position associated with the first short-length fuel rod.

FIG. 10 is a top view showing the structure of a fuel spacer 304bA in which, like the second embodiment, supporting members 318 are provided at lattice positions associated with the second short-length fuel rods 2b2 and further the spring supporting portions are removed from the supporting members 317.

As shown in FIG. 10, the supporting member 318 is provided to connect the two cells 9C and 9D, adjacently located on the outer peripheral side of the second lattice position 7b associated with the second short-length fuel rod 2b2 in the square lattice array, to the water rod holding member 12; and it is formed into an approximately cylindrical shape. Also, since supporting members 317A have no spring supporting portions, the spring arrangement in the entire spacer is changed such that the supporting member 318 has two spring supporting portions for suitably supporting the two loop-shaped springs 10 to press the fuel rods 2 inserted in the cells 9C and 9D for imparting pressing forces thereto (like the second embodiment, the known two spring supporting portions are simply provided). This modification is effective to simplify the structure because the supporting members 317 have no spring supporting portions.

In the fuel spacer in the modification shown in FIG. 10, the supporting members 317A may be formed into a semi-cylindrical (with a partial peripheral length portion cut off) shape having the same thickness as that of the cell 9. In this case, the supporting member 317A can be manufactured using the raw circular tube for forming the cell 9. This is effective to reduce the manufacturing cost by making the circular tube shareable between the supporting member 317A and the cell 9. From the viewpoint of reduction in pressure loss, it may be desirable that the peripheral length of the cylindrical shape of the supporting member 317A be made as short as possible within a length range required for welding the supporting member 317A to the adjacent cells 9 with no problem.

The shape of the supporting members 317A and 318A may be made similar to that of the supporting member 318. FIG. 11 is a top view showing the structure of a fuel spacer 304bB including supporting members 317B and 318A having the configuration described above. As shown in FIG. 11, the supporting members 317B and 318A, each being formed into a cylindrical shape with a partial peripheral length portion cut off, are identical in cross-sectional shape to each other. These supporting members 317B and 318A are substantially similar to each other except that the supporting member 317B has no spring supporting portions for supporting the loop-shaped springs 10 to press against the fuel rods 2 inserted in the cells 9C and 9D. As a result, in the manufacture of the supporting member 318A, the supporting member 317B having the same cross-sectional shape in this modification can be manufactured by punching or bending the same raw material element as that for the supporting member 318A. This is effective to reduce the manufacturing cost by making the raw material shareable between the supporting members 317B and 318A.

Fourth Embodiment

Figure 12:
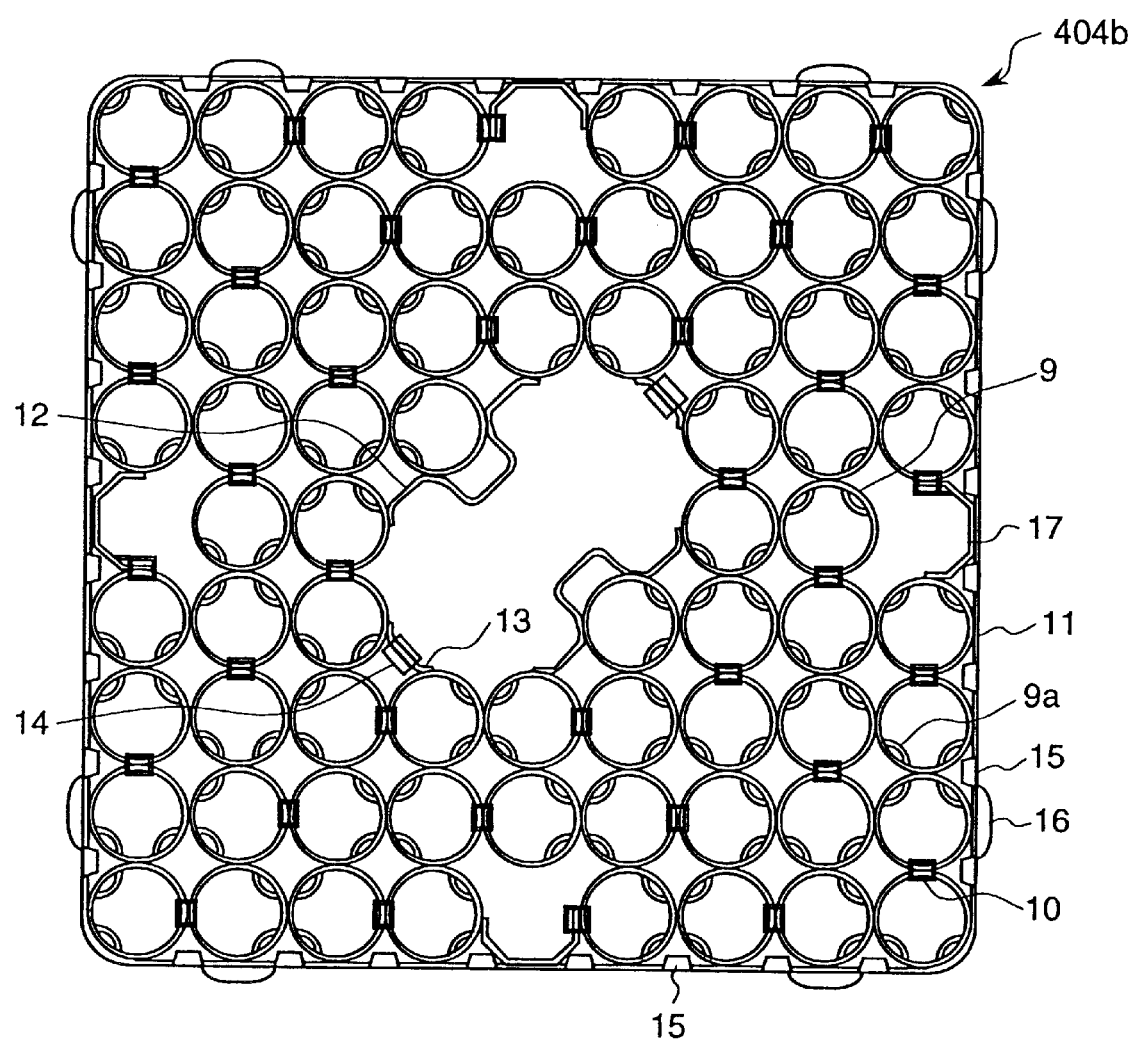
FIG. 12 is a top view showing the structure of a fuel spacer according to a fourth embodiment of the present invention.

A fourth embodiment of the present invention will be described with reference to FIG. 12. This embodiment has a feature such that, in the fuel spacer positioned above the upper ends of the first short-length fuel rods 2b1, the flow tabs are partially omitted. FIG. 12 is a top view showing the structure of a fuel spacer 404b in this embodiment. In the fuel spacer 404b, parts common to those in the fuel spacer 4b described in the first embodiment with reference to FIG. 1 are designated by the same symbols and an explanation thereof will be omitted.

The fuel spacer 404b shown in FIG. 12 is different from the fuel spacer 4b shown in FIG. 1 in that, of the large number of the flow tabs 15 formed on the band 11 for introducing the flow of a coolant, those located at positions adjacent to the supporting member 17 for connecting the cells 9A and 9B to the band 11 at each first lattice position 7a associated with the first short-length fuel rod 2b1 are omitted. The remaining configuration is substantially the same as that in the first embodiment.

This embodiment having the above configuration exhibits the following effects:

The flow tabs 15 provided on the band 11 of the fuel spacer 404b have a function of directing the flow of a coolant in the fuel assembly 1 toward the fuel rod 2 side as much as possible, thereby improving the cooling effect of the fuel rods 2 and enhancing the critical power characteristic. The flow tabs 15, however, have an inconvenience in that, since the projecting shapes of the flow tabs 15 obstruct the flow of the coolant, the pressure loss is correspondingly increased.

Incidentally, since the fuel spacer 404b is positioned above the upper ends of the short-length fuel rods 2b1, no fuel rods are present at the lattice positions associated with the short-length fuel rods 2b1 and instead the supporting members 17 are provided at the lattice positions. Accordingly, the provision of the flow tabs 15 in the vicinity of the lattice positions does not improve the critical power characteristic, but causes a problem in that it increases the pressure loss. For this reason, the flow tabs 15 adjacent to each supporting member 17 may be omitted. This is effective to eliminate an increase in pressure loss due to the projecting shapes of the flow tabs 15, and hence to further reduce the pressure loss.

In the fourth embodiment, the lattice position associated with the first short-length fuel rod 2b1 is located at the intermediate position on each of the four sides of the outermost peripheral region of the square lattice array and the flow tabs 15 adjacent thereto are omitted; however, the present invention is not limited thereto. For example, the lattice position associated with the first short-length fuel rod 2b1 may be located at any position in the outermost peripheral region, preferably, except for four corners of the square lattice array. The reason for this will be described below.

The effect of improving the critical power characteristic due to the flow tabs 15 becomes largest at the four corners in the outermost peripheral region of the square lattice array and becomes smaller at other positions in the outermost peripheral region. Accordingly, in the case where the lattice position associated with the first short-length fuel rod 2b1 is positioned in the outermost peripheral region except for the four corners and the supporting member 17 is provided at the lattice position, the effect of improving the critical power characteristic is not reduced so much even if the flow tabs 15 adjacent to the supporting member 17 are omitted; while the effect of reducing the pressure loss due to omission of the flow tabs 15 becomes large irrespective of the arrangement of the flow tabs 15. As a result, it may be desirable to locate the lattice position associated with the first short-length fuel rod 2b1 in the outermost peripheral region except for the four corners and omit the flow tabs 15 adjacent to the supporting member 17 located at the lattice position associated with the first short-length fuel rod 2b1.

In the fourth embodiment, only the flow tabs 15 adjacent to the lattice position associated with the first short-length fuel rod 2b1 in the configuration of the first embodiment are omitted; however, the present invention is not limited thereto. For example, the flow tabs 15 at other positions may be omitted insofar as an effect exerted on the critical power characteristic due to omission of the flow tabs 15 is allowable. In this case, it is possible to further reduce the pressure loss. Further, the flow tabs 15 in each configuration of the second and third embodiments may be partially omitted.

In each of the first to fourth embodiments, the present invention is applied to the fuel assembly in which the two water rods are arranged in the region in which the seven fuel rods 2 are arrangeable; however, the present invention is not limited thereto, but can be applied to a fuel assembly in which one or three or more water rods are arranged in a region in which six or less or eight or less of the fuel rods 2 are arrangeable.

Figure 13:
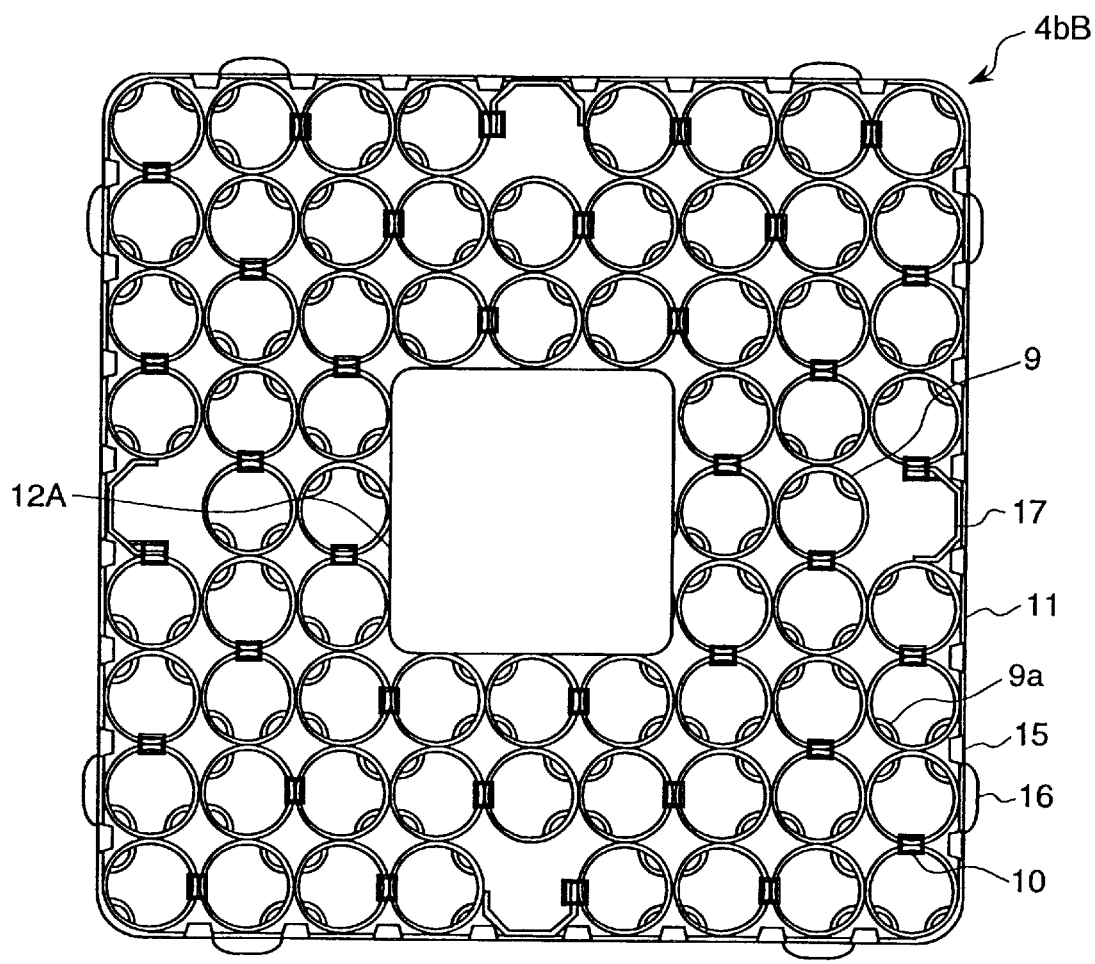
FIG. 13 is a top view showing a modification of the fuel spacer shown in FIG. 1, which is applied to a fuel assembly including a square-shaped water rod.

The present invention can be also applied to a fuel assembly including a square type water rod formed to have a square shape in transverse cross-section. FIG. 13 shows a fuel spacer 4bB of a fuel assembly including such a square type water rod, wherein the fuel spacer 4bB is modified from the fuel spacer 4b shown in FIG. 1. The fuel spacer 4bB shown in FIG. 13 is different from the fuel spacer 4b shown in FIG. 1 in that a square type water rod holding member 12A is provided at the central portion of the fuel spacer 4bB and the number of the cells 9 is correspondingly reduced to 68 cells. The remaining configuration is substantially the same as that shown in FIG. 1. The fuel spacer 4bB exhibits an effect similar to that obtained by the fuel spacer 4b.

In each of the first to fourth embodiments, the present invention is applied to a fuel assembly including second short-length fuel rods 2b2 in addition to the first short-length fuel rods 2b1; however, the present invention is not limited thereto. For example, the present invention can be applied to a fuel assembly in which fuel rods each having the normal fuel active length are located at the second lattice positions in place of the second short-length fuel rods 2b2 or no fuel rods may be provided at the second lattice positions. In this case, the same effect can be obtained.

In each of the first to four embodiments, the first short-length fuel rods 2b1 are dispersedly located in the outermost peripheral region of the square lattice array, that is, two or more of the first short-length fuel rods 2b1 are located so as to be not adjacent to each other in the outermost peripheral region, however, the present invention is not limited thereto. For example, even in the case where two or more of the short-length fuel rods are arranged in the outermost peripheral region as disclosed in Japanese Patent Laid-open No. Hei 6-2373, the cells at the lattice positions associated with the short-length fuel rods can be removed and instead members similar to the supporting members 17, 217 or 317 shown in the first to third embodiments can be provided at the lattice positions. Even in this case, there can be obtained a strength ensuring effect comparable to that obtained in each of the above-described embodiments.

Fifth Embodiment

A fifth embodiment of the present invention will be described with reference to FIGS. 14 to 20. This embodiment has a feature such that the necessary minimum number of one kind of the loop-shaped springs are reasonably arranged over an entire fuel spacer. In this embodiment, parts common to those in the first embodiment are designated by the same symbols and explanation thereof will be omitted.

Figure 14:
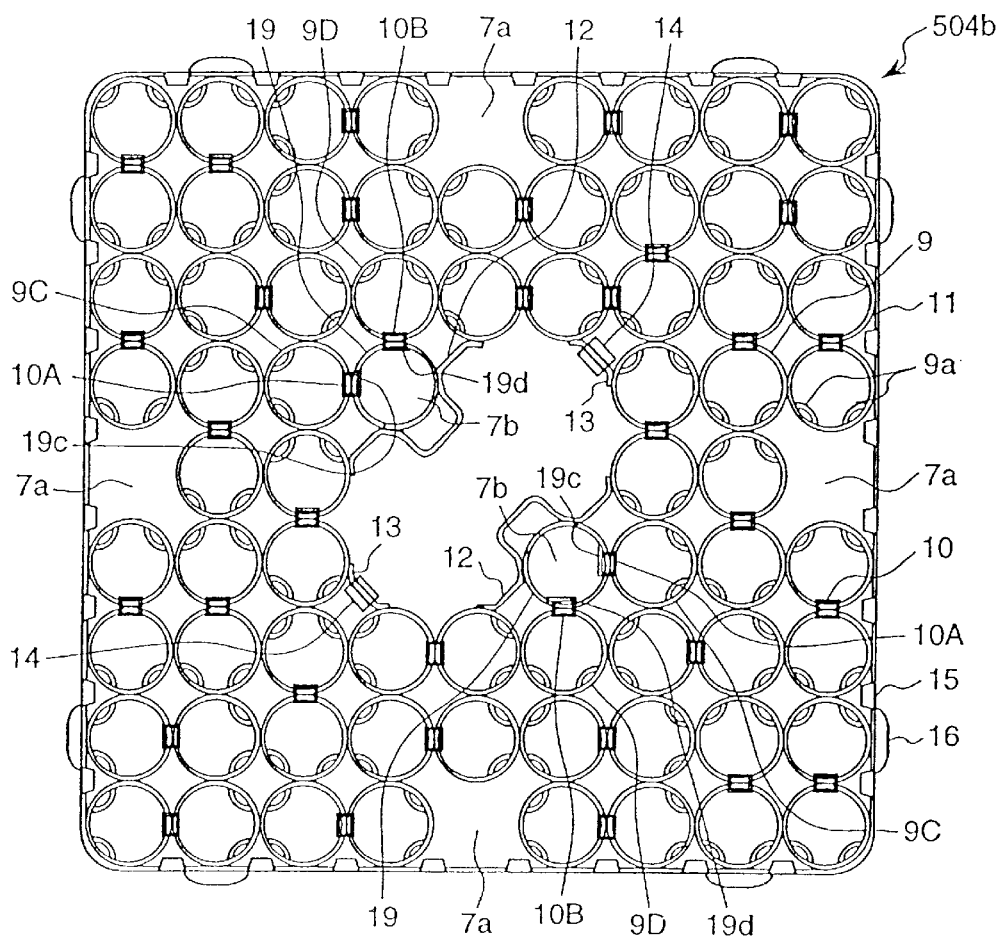
FIG. 14 is a top view showing a fuel spacer positioned upward from the upper ends of short-length fuel rods in a fuel assembly according to a fifth embodiment of the present invention.

FIG. 14 is a top view showing the structure of a fuel spacer 504b in this embodiment. As shown in FIG. 14, the fuel spacer 504b in this embodiment is configured such that the cells 9 at the first lattice positions 7a associated with the first short-length fuel rods 2b1 and the second lattice positions 7b associated with the second short-length fuel rods 2b2 are removed, and correspondingly, the arrangement of the loop-shaped springs 10 over the fuel spacer 504b is entirely changed from that in the fuel spacer 4a shown in FIG. 4. That is to say, with respect to the cell 9C adjacent in the same row to one of the two second lattice positions 7b adjacent to the water rods 3 and the cell 9D adjacent in the same column to the above second lattice position 7b, each of the cells 9C and 9D includes, at a portion on the second lattice position 7b side, a known spring supporting portion. A loop-shaped spring 10A (10B) for pressing against the fuel rod 2 inserted in the cell 9C (9D) is provided in the above spring supporting portion provided in the cell 9C (9D).

The loop-shaped spring 10A (10B) is, as will be described later, supported by an approximately cylindrical spring pressing member 19 provided at the second lattice position 7b in such a manner as to generate a pressing force applied to the fuel rod 2 inserted in the cell 9C (9D). The spring pressing member 19 is made as thin as possible within an allowable range in terms of the structural strength of the fuel spacer. That is to say, to reduce the pressure loss the transverse cross-section of the spring pressing member 19 is made smaller than the transverse cross-section of the cell 9. In addition, the spring pressing member 19 can be manufactured commonly using the raw circular tube for forming the cell 9. This is effective to reduce the manufacturing cost by making the raw material shareable between the spring pressing member 19 and the cell 9. The water rod holding member 12 formed into the Ω-shape in transverse cross-section is joined to each of the two spring pressing members 19.

The detailed structure near the two second lattice positions 7b, which forms the largest difference between the fuel spacer 504b and the fuel spacer 4a, will be described below.

(1) Fuel Spacer 4a

Figure 15:
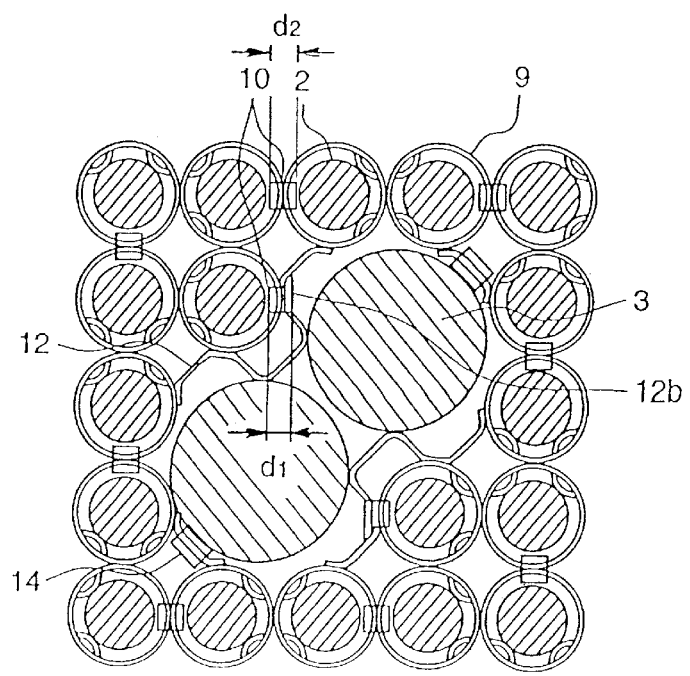
FIG. 15 is a transverse sectional view showing the detailed structure of the fuel spacer shown in FIG. 14.
Figure 16:
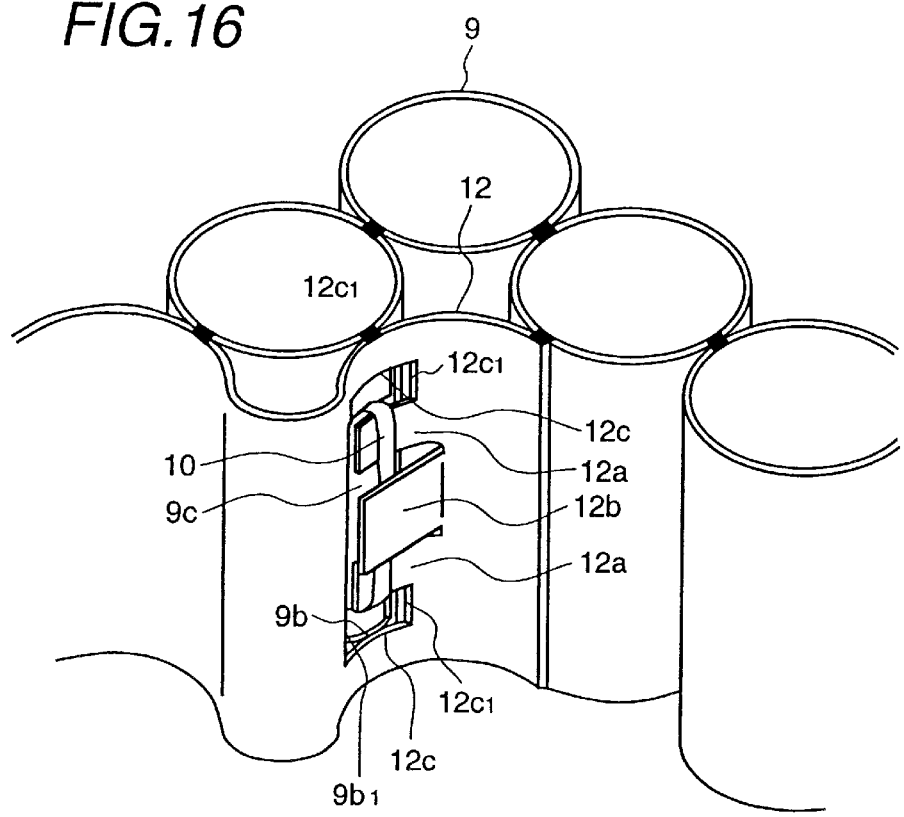
FIG. 16 is a perspective view showing the structure near the joined portions between a water rod holding member and cells in the fuel spacer shown in FIG. 15.

FIG. 15 is a transverse sectional view showing the structure near the two second lattice positions 7b of the fuel spacer 4a; and FIG. 16 is a perspective view showing the structure near the joined portions between the water rod holding member 12 and the cells 9. In addition, for convenience in description, the fuel rods 2 and the water rods 3 are additionally shown in FIG. 15.

Referring to FIGS. 15 and 16, the water rod holding member 12 includes two spring holding projecting pieces 12a each of which projects in the shape of tongue in the loop of the loop-shaped spring 10 for holding the loop-shaped spring 10, and a spring pressing projecting piece 12b which projects in the shape of tongue in such a manner as to be brought in contact with the loop of the loop-shaped spring 10 from the outer peripheral side.

The two spring holding projecting pieces 12a and the spring pressing projecting piece 12b all project in the same direction (leftward in FIG. 16), and the two spring holding projecting pieces 12a are provided above and below the spring pressing projecting piece 12b, respectively. These spring holding projecting pieces 12a and the spring pressing projecting piece 12b are manufactured by press-working a base portion of the water rod holding member 12 to form tongue-shaped cut pieces corresponding to the projecting pieces 12a and 12b and two windows 12c. The spring pressing projecting piece 12b is finished by bending the corresponding tongue-shaped cut piece from its root and then flattening it. The windows 12c are provided to provide spaces in which the loop-shaped spring 10 is inserted when the loop-shaped spring 10 is mounted.

The cell 9 to be joined to the water rod holding member 12 has two windows 9b (only one is shown for simplicity) and a projecting piece 9c which projects in the direction opposed to the projecting direction of the projecting pieces 12a. The two spring holding projecting pieces 12a are in contact with the projecting piece 9c. The contact portions of the spring holding projecting pieces 12a with the cell projecting piece 9c are inserted in the loop of the loop-shaped spring 10, so that the vertical movement of the looped spring 10 may be restricted. In addition, both ends of the windows 12c and 9b form removal preventive portions 12c1 and 9b1 (only partially shown) for preventing the removal of the loop-shaped spring 10.

The spring pressing projecting piece 12b functions to restrict the horizontal displacement of the loop-shaped spring 10 due to expansion/contraction thereof, and hence to generate a pressing force applied to the fuel rod 2 inserted in the cell 9. At this time, as shown in FIG. 15, the distance d1 between the spring pressing projecting piece 12b and the adjacent fuel rod 2 is made equal to the distance d2 between the two adjacent fuel rods 2. With this configuration, a pressing force of the loop-shaped spring 10 generated when the spring 10 is pressed by the spring pressing projecting piece 12b is made equal to a spring pressing force of the loop-shaped spring 10 generated when the spring 10 is held between the two fuel rods 2. As a result, the fuel rod 2 can be suitably fixed in the cell 9 at the lattice position 7b.

(11) Fuel Spacer 504b

Figure 17:
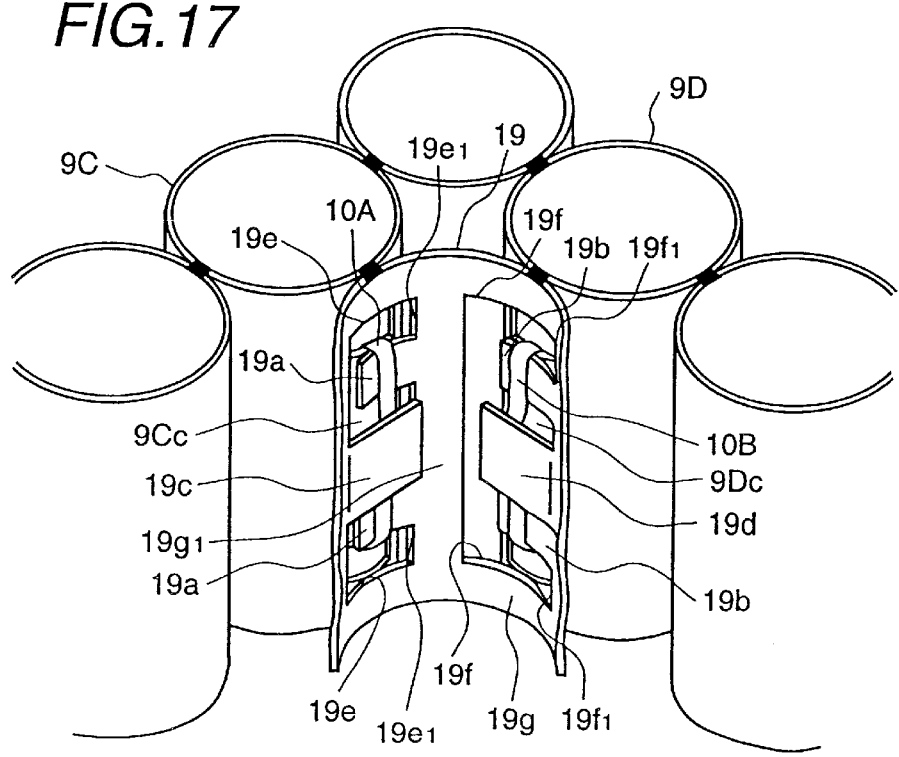
FIG. 17 is a perspective view, with parts partially cutaway, showing the structure near the joined portions between a spring pressing member and cells in the fuel spacer shown in FIG. 14.

FIG. 17 is a perspective view, with parts partially cutaway, showing the structure near the joined portions between the spring pressing member 19 and the cells 9 in the fuel spacer 504b, which is an essential portion of this embodiment. Referring to FIG. 17, the spring pressing member 19 includes two spring holding projecting pieces 19a and two spring holding projecting pieces 19b, which function as spring holding portions projecting in the shape of a tongue inserted in the loops of the loop-shaped springs 10A and 10B for holding the loop-shaped springs 10A and 10B, respectively; and two spring pressing projecting pieces 19C and 19D which function as spring pressing portions projecting in the shape of a tongue in such a manner as to be in contact with the loops of the loop-shaped springs 10A and 10B from the outer peripheral side, respectively.

The structures and functions of these projecting pieces 19a (19b) and 19c (19d) are similar to those of the projecting pieces 12a and 12b of the water rod holding member 12 described in the paragraph (1), respectively. To be more specific, the two spring holding projecting pieces 19a are provided above and below the spring pressing projecting piece 19c, respectively; and the two spring holding projecting pieces 19b are provided above and below the spring pressing projecting piece 19d, respectively. These spring holding projecting pieces 19a and 19b and the spring pressing projecting pieces 19c and 19d are manufactured by press-working a cylindrical base portion 19g of the spring pressing member 19 to form tongue-shaped cut pieces corresponding to the projecting pieces 19a, 19b and 19c and 19d and four windows 19e and 19f. Each of the spring pressing projecting pieces 19c and 19d is finished by bending the corresponding tongue-shaped cut piece from its root and then flattening it.

At this time, the two spring holding pieces 19a (19b) are in contact with a projecting piece 9Cc (9Dc) formed in the cell 9C (9D), and the contact portions of the spring holding projecting pieces 19a (19b),with the cell projecting piece 9Cc (9Dc) are inserted in the loop-shaped spring 10A(10B). In addition, to prevent the removal of the loop-shaped spring 10A (10B), the ends of windows 19e (19f) of the loop-shaped spring 10A (10B) have removal preventive portions 19e1 (19f1) and the ends of the windows of the cell 9C (9D) have removal preventive portions (not shown for simplicity).

The spring pressing projecting piece 19c (19d) functions to restrict the horizontal displacement of the loop-shaped spring 10A (10B) due to expansion/contraction thereof, and hence to generate a suitable pressing force (similar to the pressing force described in the paragraph (1)) to the fuel rod 2 inserted in the cell 9C (9D).

Here, there is a large structural difference between the projecting pieces 19a, 19b, 19c and 19d and the projecting pieces 12a and 12b of the water rod holding member 12 described in the paragraph (1) in that the spring holding projecting pieces 19a and 19b all project in the same direction (leftward in FIG. 17) and one spring pressing projecting piece 19d also projects in the same direction; however, the other spring pressing projecting piece 19c projects in the opposite direction (rightward in FIG. 17).

The function of this embodiment having the above configuration will be described below.

(1) Improvement in Reactivity Controllability In the fuel assembly 1 in this embodiment, since six of the short-length fuel rods 2b are included with the fuel rods 2 arranged in the square lattice array of 9 rows×9 columns, it is possible to equalize the H/U ratio by making use of a saturated water region formed on the upper side of the short-length fuel rods 2b. At this time, by arranging the short-length fuel rods 2b at the lattice positions in the outermost peripheral region of the square lattice array and at the lattice positions adjacent to the water rods, it is possible to more effectively improve the controllability of the reactivity by reducing the void coefficient as disclosed in Japanese Patent Laid-open No. Hei 5-232273.

(2) Reduction in Pressure Loss

Since the unnecessary cells 9 at the first and second lattice positions 7a and 7b in the fuel spacer 4b positioned above the upper ends of the short-length fuel rods 2b are omitted, the pressure loss can be correspondingly reduced. In addition, a spring pressing member 19 is provided in place of the cell 9 at each second lattice position 7b; however, since the transverse cross-section of the spring pressing member 19 is made smaller than that of the cell 9 as described above, it is possible to reduce the pressure loss. 1

(3) Reasonable Arrangement of Spring

As a result of removing the cells 9 in the fuel spacer 504b for reducing the pressure loss (see the paragraph (2)), the arrangement of the loop-shaped springs 10 over the entire fuel spacer is necessarily changed such that the loop-shaped springs 10A and 10B are respectively provided on portions, on the second lattice position 7b side, of the cells 9C and 9D located at the lattice positions adjacent to each of the two second lattice positions 7b for pressing against the fuel rods 2 in the cells 9C and 9D. The usual loop-shaped spring 10 functions to generate pressing forces when the fuel rods 2 are inserted in a pair of the adjacent cells 9, and accordingly, if such usual loop-shaped springs are used for the loop-shaped springs 10A and 10B, the loop-shaped springs 10A and 10B are made free on the second lattice position 7b side and thereby cannot generate the pressing forces.

Incidentally, the structure in which one loop-shaped spring which is free on one side is supported at one lattice position in such a manner as to generate a suitable pressing force has been known, for example, as represented by the structure shown in FIG. 16 or the structure disclosed in Japanese Patent Laid-open No. Hei 6-273560; however, the above-described structure in which the two loop-shaped springs 10A and 10B each being free on one side are supported at one lattice position has not been known.

On the contrary, in the fuel spacer 504b in this embodiment, since the spring pressing member 19, which includes the four spring holding projecting pieces 19a and 19b and the two spring pressing projecting pieces 19c and 19d, is provided at one of two second lattice positions 7b, it is possible to support the loop-shaped springs 10A and 10B so that each is free on one side and hence to generate suitable pressing forces. This makes it possible to reasonably arrange the necessary minimum number (36 pieces) of the loop-shaped springs 10 over the entire fuel spacer without increasing the kinds of springs being used, more specifically, using only one kind of the springs.

Figure 18:
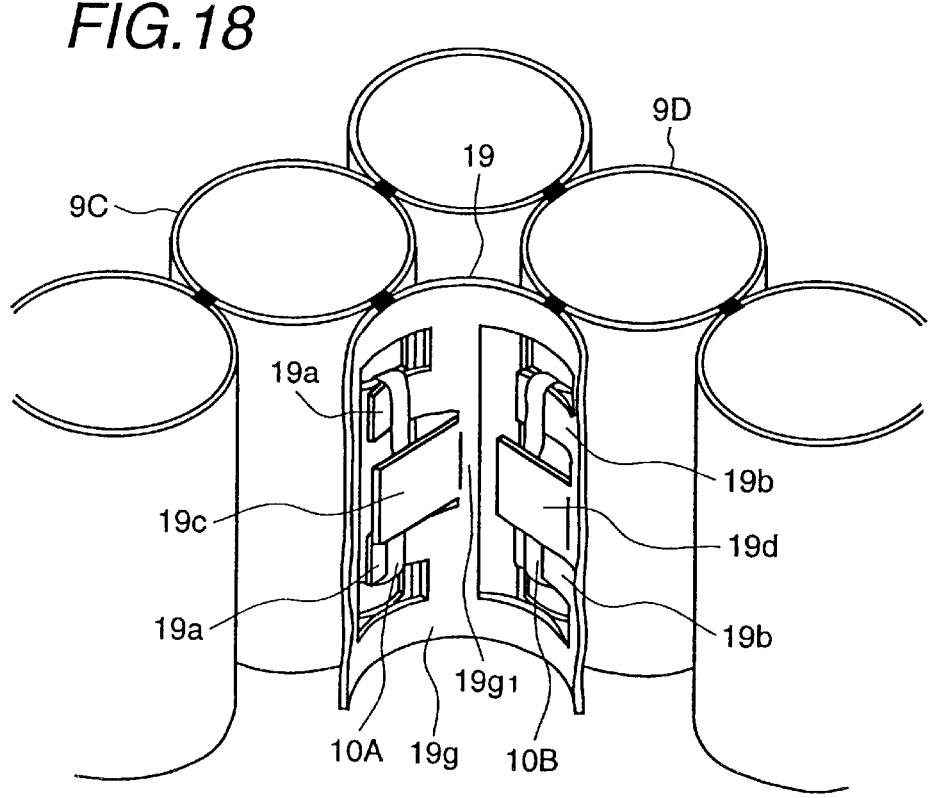
FIG. 18 is a perspective view, with parts partially cutaway, showing the structure near the joined portions between a spring pressing member and cells in a comparative example.

(4) Attainment of Rigidity/Strength of Spring Pressing Member to Pressing Force of Spring This function will be described with reference to a comparative example. FIG. 18 is a perspective view, with parts partially cutaway, showing the structure near the joined portions between a spring pressing member and the cells in the comparative example. In FIG. 18, parts common to those in FIG. 17 are designated by the same symbols.

In the comparative example shown in FIG. 18, two of the structures shown in FIG. 16, each being similar to that disclosed in Japanese Patent Laid-open No. Hei 6-273560, are simply arranged for supporting the two loop-shaped springs 10A and 10B so that each is free on one side at one second lattice position 7b. The structure shown in FIG. 18 is different from that shown in FIG. 17 in that the spring holding projecting pieces 19a and 19b all project in the same direction (leftward in FIG. 18) and the two spring pressing projecting pieces 19c and 19d project in the same direction (leftward in FIG. 18).

Such a structure as shown in FIG. 18 has the following inconvenience. That is to say, to bring the spring pressing projecting pieces 19c and 19d in contact with the loops of the loop-shaped springs 10A and 10B from the outer peripheral side, the spring pressing projecting pieces 19c and 19d are required to project on the inner side (toward the front in FIG. 18) of the spring pressing member 19 more than the spring holding projecting pieces 19a and 19b inserted in the loops.

Accordingly, if the projecting direction of all of the spring pressing projecting pieces 19c and 19d is made identical to the projecting direction of the spring holding projecting pieces 19a and 19b, the size of the cutouts on both sides of the spring pressing projecting pieces 19c and 19d must be made larger, and correspondingly the width (or area) of a bridge 19g1, equivalent to the root portion of-the spring pressing projecting piece 19c, of the base plate portion 19g of the spring pressing member 19 becomes smaller. This makes it difficult to ensure a sufficient strength and rigidity against the pressing force of the loop-shaped spring 10A.

On the contrary, according to the configuration of this embodiment as shown in FIG. 17, since the projecting direction of one spring pressing projecting piece 19c is reversed relative to the projecting direction of the spring holding projecting pieces 19a and 19b, the width (or area) of the bridge 19g1 can be made larger. This makes it possible to ensure a sufficient strength and rigidity.

As described above, according to this embodiment, the fuel assembly 1 is configured such that the shortlength fuel rods 2b are arranged in the outermost peripheral region of the square lattice array of 9 rows×9 columns adjacent to the water rods 3, and at the fuel spacer 4b, the cells 9 at the lattice positions 7a and 7b associated with the short-length fuel rods 2b are removed to reduce the pressure loss. In this fuel assembly 1, the two loop-shaped springs 10A and 10B, each being free on one side, are supported by the spring pressing member 19 at one second lattice position 7b, so that the necessary minimum number of the loop-shaped springs 10 may be reasonably arranged over the entire fuel spacer without increasing kinds of the springs being used.

Since the number of the loop-shaped springs 10 is selected at the necessary minimum value, there can be obtained an effect of further reducing the pressure loss, and since the width (or area) of the bridge 19g1 can be made larger, there can be obtained an effect of ensuring a sufficient strength and rigidity against the pressing forces of the loop-shaped springs 10A and 10B.

In the fifth embodiment, the spring holding projecting pieces 19a and 19b all project in the same direction (leftward in FIG. 17) and one spring pressing projecting piece 19d also projects in the same direction; while the other spring pressing projecting piece 19c projects in the opposite direction (rightward in FIG. 17); however, the structure of the projecting pieces is not limited thereto.

Figure 19:
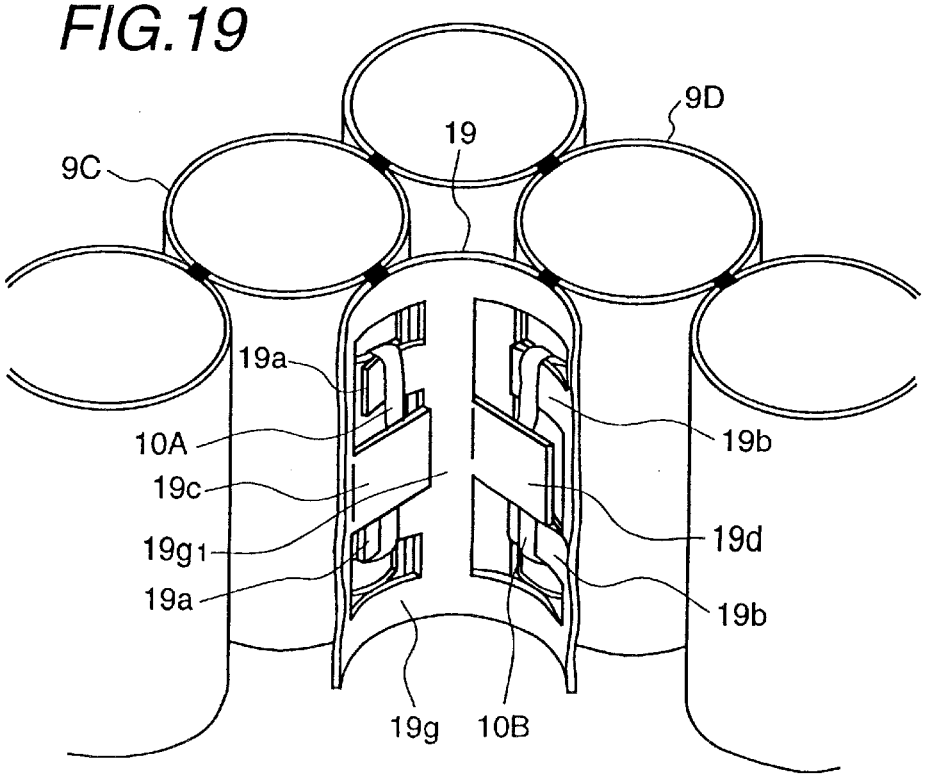
FIG. 19 is a perspective view, with parts partially cutaway, showing the structure near the joined portions between a spring pressing member and cells in a first modification of the structure shown in FIG. 17.

Hereinafter, two modifications will be described with reference to FIGS. 19 and 20. FIG. 19 is a perspective view, with parts partially cutaway, showing the structure near the joined portions between the spring pressing member and the cells according to the first modification. In FIG. 19, parts common to those in FIG. 17 are designated by the same symbols. The structure shown in FIG. 19 is different from that shown in FIG. 17 in that the spring holding projecting pieces 19a and 19b all project in the same direction (leftward in FIG. 19), while both spring pressing projecting pieces 19c and 19d project in the opposite direction (rightward in FIG. 19).

With this structure, since the width (or area) of the bridge 19g1 can be made larger than that in the comparative example shown in FIG. 18, it is possible to ensure a sufficient strength and rigidity against the pressing forces of the loop-shaped springs 10A and 10B. That is to say, it becomes apparent that at least one of the spring pressing projecting pieces may project in the direction opposite to the projecting direction of the spring holding projecting pieces.

Figure 20:
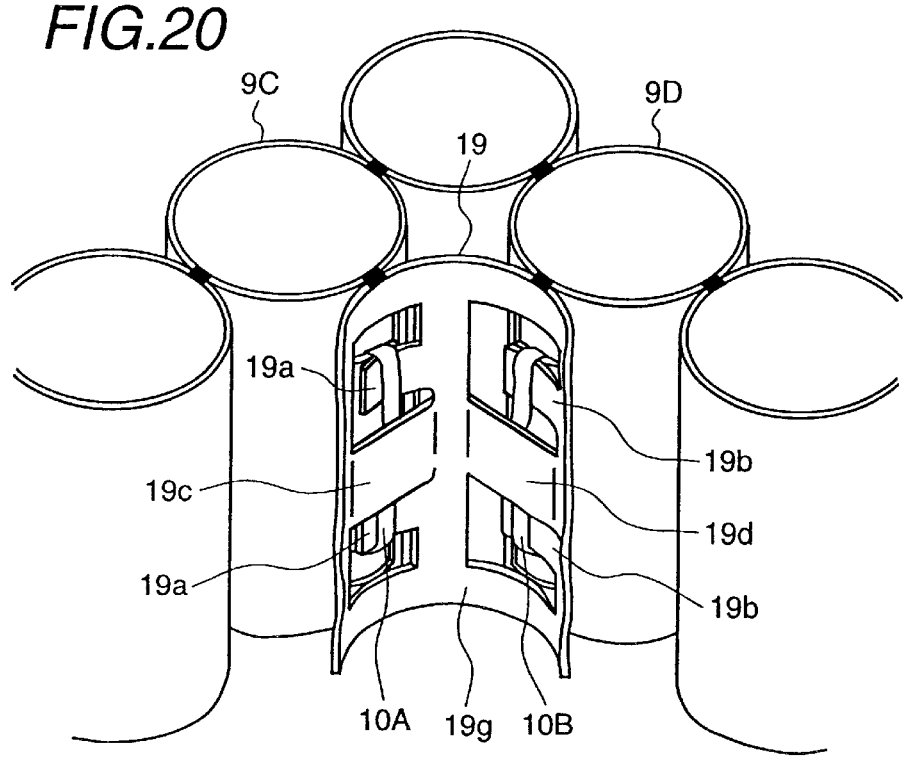
FIG. 20 is a perspective view, with parts partially cutaway, showing the structure near the joined portions between a spring pressing member and cells in a second modification of the structure shown in FIG. 17.

FIG. 20 is a perspective view, with parts partially cutaway, showing the structure near the joined portions between the spring pressing member and the cells according to the second modification. In FIG. 20, parts common to those in FIG. 17 are designated by the same symbols. The structure shown in FIG. 20 is different from that shown in FIG. 17 in that the opposed free ends of the spring pressing projecting pieces 19c and 19d in the structure shown in FIG. 17 are connected to the base plate portion 19g of the spring pressing member 19, that is, as shown in FIG. 19, both right and left ends of each of the projecting pieces 19c and 19d are connected to the base plate portion 19g so as to be integrally formed therewith.

In the second modification, when the pressing forces of the loop-shaped springs 10A and 10B are applied to the spring pressing projecting pieces 19c and 19d, they can be supported by the base plate portion 19g connected to both sides of each of the spring pressing projecting pieces 19c and 19d. This is effective to ensure a sufficient strength and rigidity.

The second modification has another effect. In the structures shown in FIGS. 17 and 19, as described above, the spring pressing projecting pieces 19c and 19d are manufactured by forming tongue-shaped cut pieces in the base plate portion 19g of the spring pressing member 19, bending the cut pieces from the roots thereof and flattening them. In contrast, in this modification, the spring pressing projecting pieces 19c and 19d can be simply manufactured merely by forming cut lines corresponding to both side lines of the projecting pieces 19c and 19d in the base plate portion 19g of the spring pressing member 19 and pressing the portions surrounded by the cut lines such that the portions project inward of the spring pressing member 19. This is effective to reduce the manufacturing cost.

Figure 21:
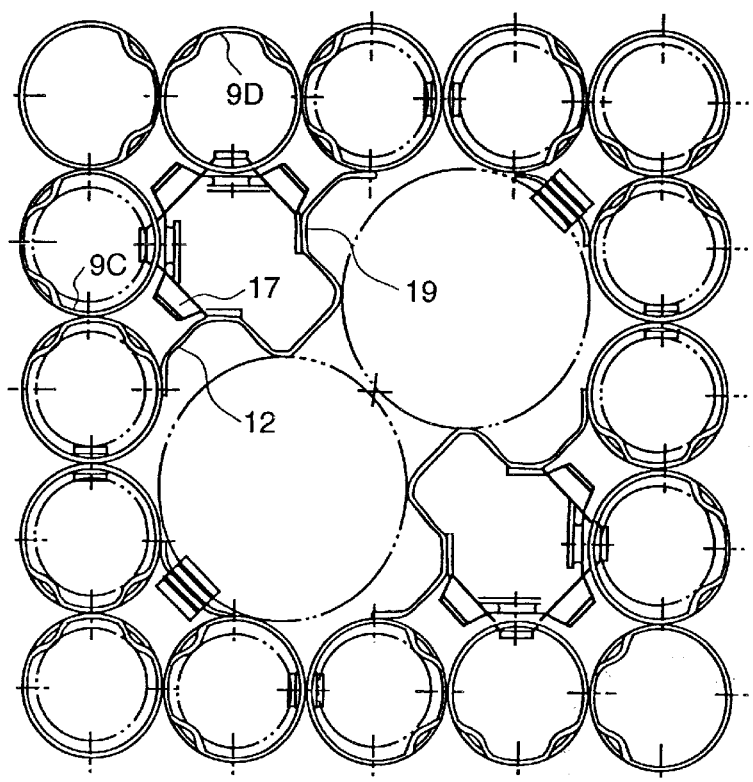
FIG. 21 is an enlarged sectional view showing a modification of the structure shown in FIG. 14, in which flow tabs are provided on a spring pressing member.

While the spring pressing member 19 is formed into an approximately cylindrical shape in the fifth embodiment, the present invention is not limited thereto. For example, like the supporting member 218 in the second embodiment, the spring pressing member 19 may be formed into an approximately polygonal shape from which a partial side portion is removed for reducing the pressure loss. As shown in FIG. 21, flow tabs 17 having the same function as that of the flow tabs 15 provided on the band 11 may be provided on the spring pressing member 19. The flow tabs 17 project outward from the outer periphery of the spring pressing member 19 for introducing the flow of a coolant in the projecting direction of the flow tab 17. The structure including the flow tabs 17 exhibits the following effect.

The spring pressing member 19 at the second lattice position 7b, which is at the level in which no fuel rod 2 is present is not required to be cooled. Accordingly, to direct the flow of a coolant passing through the spring pressing member 19 toward the other fuel rods 2 around the lattice position 7b as much as possible, the flow tabs 17 are provided on the spring pressing member 19. This makes effective use of the coolant and hence improves the effect of cooling the fuel rods 2.

Sixth Embodiment

Figure 22:
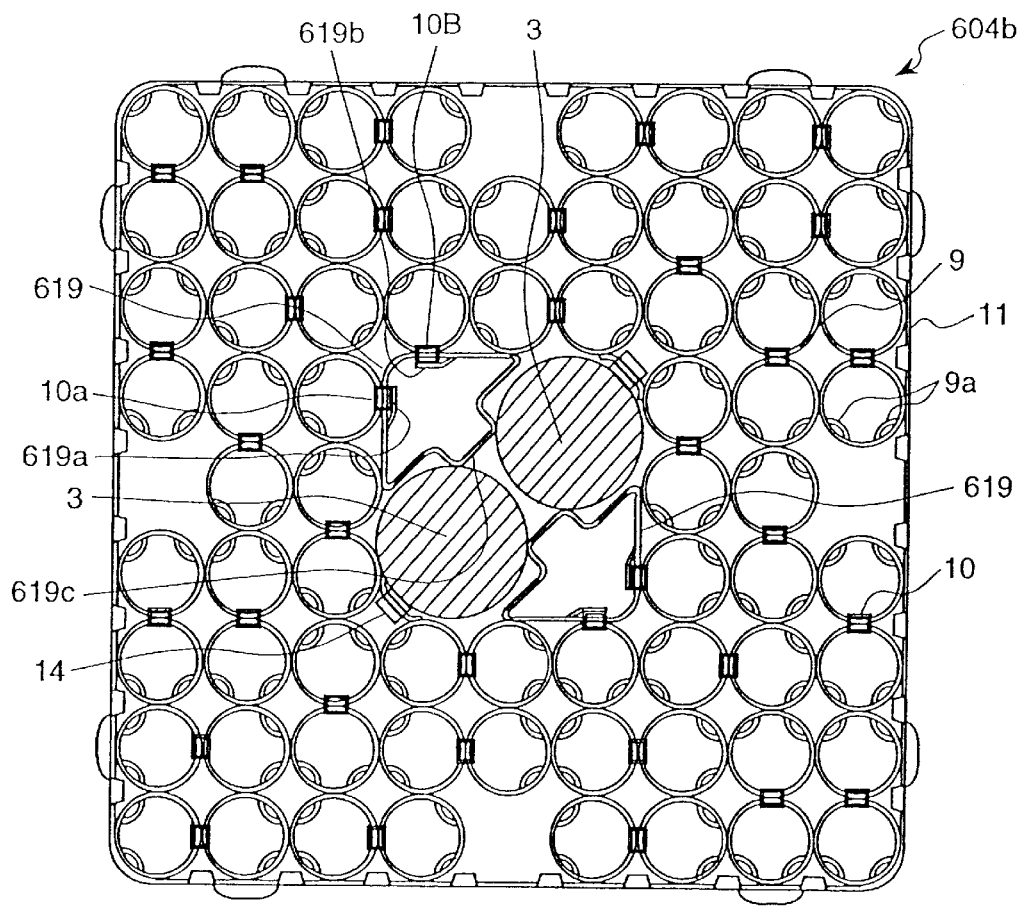
FIG. 22 is a top view showing the structure of a fuel spacer according to a sixth embodiment of the present invention.

A sixth embodiment of the present invention will be described with reference to FIG. 22. In this embodiment, a spring pressing member having a shape different from that in the fuel spacer 504b of the fifth embodiment is provided. Parts common to those in FIG. 1 are designated by the same symbols and an explanation thereof will be omitted. FIG. 22 is a top view showing the structure of a fuel spacer 604b in this embodiment. In addition, the water rods 3 are also shown in the figure for more clearly showing the structure of the fuel spacer 604b.

Like the fuel spacer 504b, the fuel spacer 604b shown in FIG. 22 is positioned above the upper ends of the short-length fuel rods 2b in the fuel assembly 1 shown in FIG. 2 or FIG. 3. In the fuel spacer 604b, the spring pressing member 19 of the fuel spacer 504b shown in FIG. 14 is replaced with a spring pressing member 619, formed into an umbrella shape in transverse cross-section, which has a function of the spring pressing member 19 in combination with the function of the water rod holding member 12.

The structure of the spring pressing member 619 will be briefly described. Like the spring pressing member 19 shown in FIG. 14, the spring pressing member 619 includes spring holding projecting pieces (not shown) which are inserted in the loops of the loop-shaped springs 10A and 10B for holding the loop-shaped springs 10A and 10B; and spring pressing projecting pieces 619a and 619b which are brought in contact with the loops of the loop-shaped springs 10A and 10B from the outer peripheral side. The spring pressing member 619 also includes a water rod holding portion 619c which functions to hold the water rod 3 in the radial and axial directions, like, the water rod holding member 12 shown in FIG. 14. The remaining configuration is substantially the same as that of the fuel spacer 504b in the fifth embodiment.

The fuel assembly including the fuel spacer 604b in this embodiment exhibits an effect comparable to that of the fuel assembly including the fuel spacer 504b in the fifth embodiment. Additionally, according to this embodiment, since the spring pressing member 19 and the water rod holding member 12 are replaced with the spring pressing member 619, it is possible to reduce the number of parts, and hence to lower the manufacturing cost; and also it is possible to reduce the transverse cross section of the portion adjacent to the water rods 3, and hence to further reduce the pressure loss.

In the sixth embodiment, the structures of the spring pressing projecting pieces 619a and 619b and the spring pressing projecting pieces are not limited to those shown in FIG. 17, but may be similar to those shown in FIGS. 19 or 20.

In the fifth and sixth embodiments, description is made by way of example of a fuel assembly in which the fuel rods 2 are located in a square lattice array of 9 rows×9 columns; however, the present invention can be applied to a fuel assembly having a square lattice array of 8 rows×8 columns or 10 rows×10 columns, or a rectangular lattice array in which the rows and columns are different in number. Even in such a fuel assembly, if two of the loop-shaped springs are required to be supported at one lattice position, the concept of the present invention can be applied thereto, with a result that the same effect can be obtained.

In a fuel assembly having a square lattice array of 9 rows×9 columns in which the arrangement of the loop-shaped springs 10 is different from that shown in FIG. 14 or FIG. 22, if two of the loop-shaped springs are required to be supported at one lattice position, the concept of the present invention can be applied thereto, with a result that the same effect can be obtained.

Figure 23:
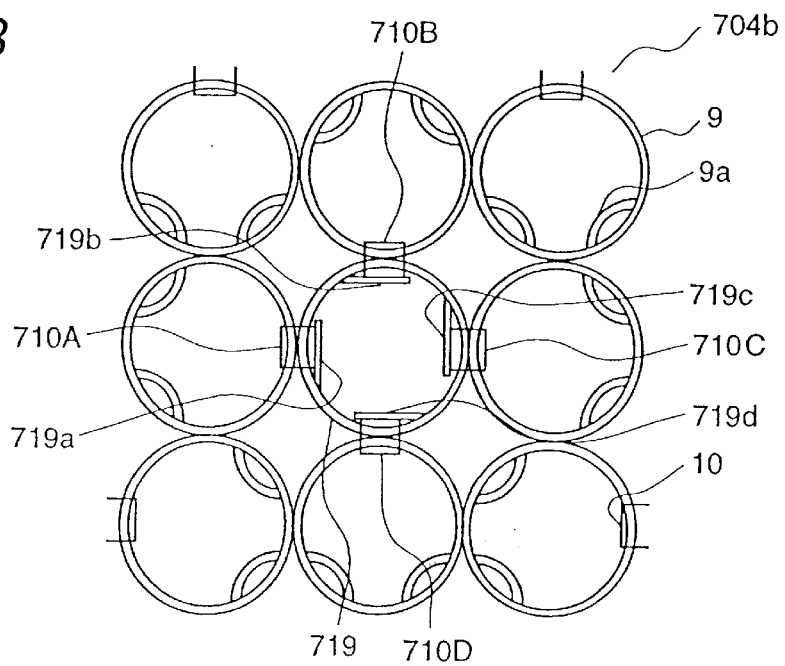
FIG. 23 is a top view showing an essential structure of a modification of the fuel spacer shown in FIG. 14 or 22, in which three or more loop-shaped springs are supported by a spring supporting member.
Figure 24:
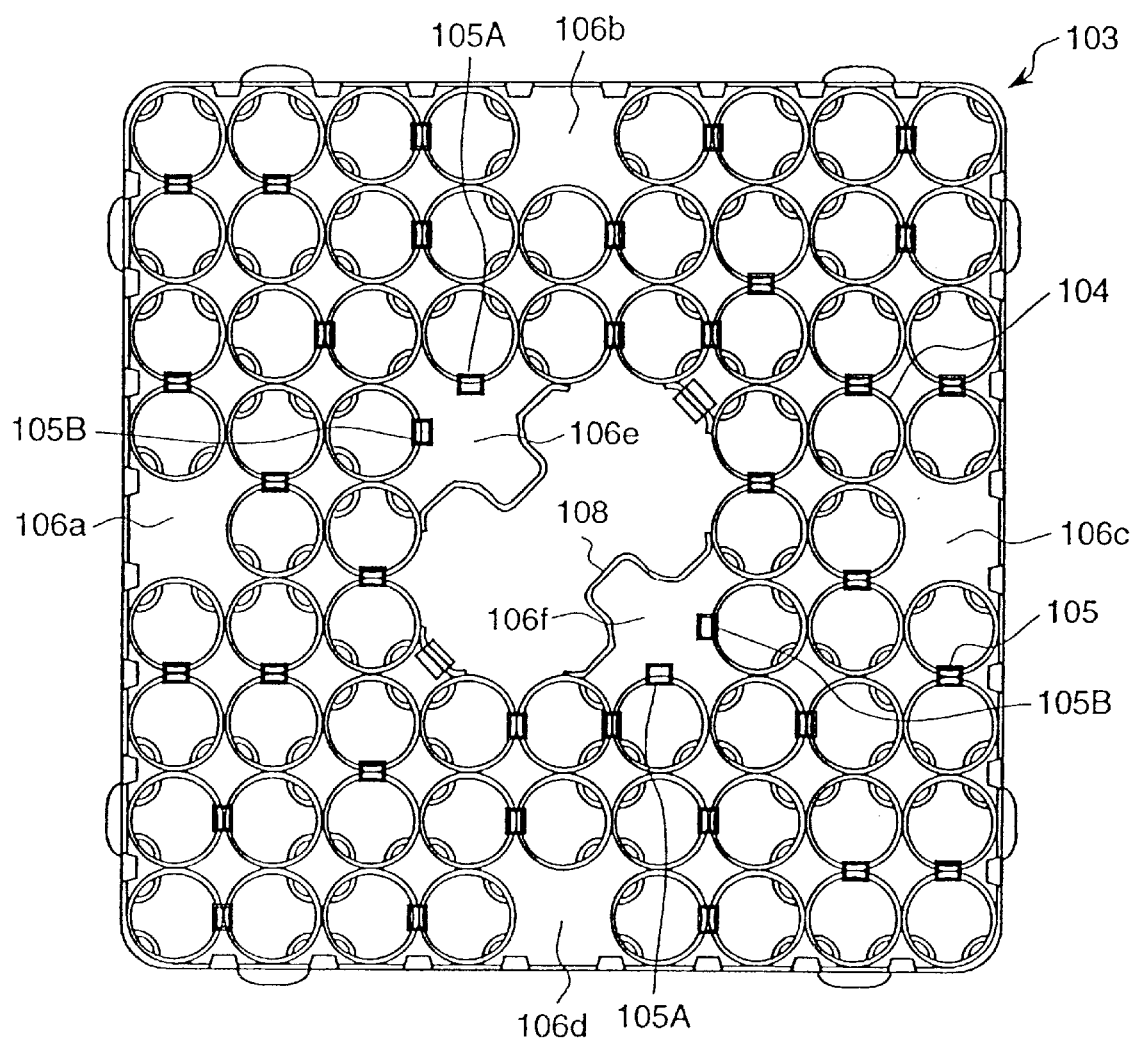
FIG. 24 is a top view illustrating problems caused in a fuel spacer positioned upward from the upper ends of short-length fuel rods in a fuel assembly.

Even in the case where three or more of the loop-shaped springs 10 are required to be supported at one lattice position, the concept of the present invention can be applied thereto. Such a modification will be described with reference to FIG. 23. FIG. 23 is a top view showing the structure of an essential portion of a fuel spacer 704b in this modification. Like the fuel spacers 504b and 604b, the fuel spacer 704b shown in FIG. 23 is positioned above the upper ends of the short-length fuel rods 2 in the fuel assembly 1 shown in FIG. 2 or 3.

In the case of reviewing the arrangement of the loop-shaped springs 10 in accordance with removal of the cells 9 to reduce the pressure loss, there may occur a requirement in which four free loop-shaped springs 710A to 710D (each having the same structure as that of the loop-shaped spring 10) need to be supported at one lattice position, other than those in the outermost peripheral region of the square lattice array and those adjacent to the water rods 3. To meet such a requirement, the fuel spacer 704b is provided with a cylindrical spring pressing member 719 for supporting the springs 710A to 710D in such a manner that the springs can generate suitable pressing forces.

The structure of the spring pressing member 719 will be briefly described. Like the spring pressing member 19 shown in FIG. 19, the spring pressing member 719 includes four spring holding projecting pieces (not shown) which are inserted in the loops of the four loop-shaped springs 710A to 710D surrounding the spring pressing member 719 for holding the loop-shaped springs 710A to 710D; and four spring pressing projecting pieces 719a to 719d which are brought in contact with the loops of the loop-shaped springs 710A to 710D from the outer peripheral side. The spring pressing member 719 is also made as thin as possible within an allowable thickness range in terms of the structural strength of the fuel spacer for making the transverse cross-section thereof smaller than that of the cell 9, thereby reducing the pressure loss. The remaining configuration is substantially the same as that of the fuel spacer 504b in the fifth embodiment.

Like the fifth embodiment, the fuel assembly including the fuel spacer 704b in this embodiment exhibits an effect of reasonably arranging the necessary minimum number of the loop-shaped springs 710 over the fuel spacer without increasing the number of kinds of springs by supporting the four free loop-shaped springs 710A to 710D at one lattice position by means of the spring pressing member 719.

In the above modification, description is made by way of. example of the case of providing four free loop-shaped springs 710A to 710D; however, the present invention is not limited thereto, but may be applied to the case of providing only three of the free loop-shaped springs. In this case, by providing three sets of the spring pressing projecting pieces 719a to 719c and the spring holding projecting pieces, an effect similar to that described above can be obtained.

Since the variations in allowable arrangement of the loop-shaped springs can be further increased by making the spring pressing member 719 in the above modification in combination with the spring pressing members 19 and 619 in the fifth and sixth embodiments, this arrangement is expected to provide a more effective fuel spacer from the viewpoint of reduction in pressure loss.

In each of the first to sixth embodiments, description is made by way of example of a fuel assembly in which the fuel rods 2 are located in a square lattice array of 9 rows×9 columns; however, the present invention is not limited thereto, but may be applied to another fuel assembly having a square lattice array of 8 rows×8 columns, 10 rows×10 columns, or the like. In this case, an effect similar to that described above can be obtained.

While the preferred embodiments of the present invention have been described using specific examples, such description is for illustrative purposes only, and it is to be understood that changes and variations may be made without departing from the spirit or scope of the following claims.

What is claimed is:

1. A fuel assembly comprising:

a plurality of fuel rods arranged in a square lattice array, said fuel rods including a plurality of short-length fuel rods each having a fuel active length shorter than that of said fuel rods which are non-short-length fuel rods;

at least one water rod arranged in a region in which at least one of said fuel rods are arrangeable in said array; and a plurality of fuel spacers, provided at a plurality of positions in the axial direction, for holding said plurality of fuel rods and said at least one water rod with mutual radial intervals therebetween kept immovable;

wherein said plurality of short-length fuel rods include at least one first short-length fuel rod arranged in the outermost peripheral region of said square lattice array, and at least one second short-length fuel rod arranged at a lattice position adjacent to said at least one water rod;

each of said plurality of fuel spacers including a plurality of cylindrical members which are connected to each other and in which said fuel rods are to be inserted respectively, and first loop-shaped springs each of which is provided at a joined portion between a pair of adjacent cylindrical members for pressing two of said fuel rods inserted in said adjacent cylindrical members;

said plurality of fuel spacers including first fuel spacers positioned above the upper ends of said first and second short-length fuel rods, and at least one of said first fuel spacers is configured such that cylindrical members are omitted at locations of first and second lattice positions associated with said first and second short-length fuel rods;

each of said plurality of cylindrical members located at lattice positions adjacent to said second lattice position has on said second lattice position side a second loop-shaped spring for pressing said fuel rod in said cylindrical member;

said plurality of second loop-shaped springs located at said lattice positions adjacent to said second lattice position are supported by a spring pressing member provided at said second lattice position, said spring pressing member having a transverse cross-section smaller than a transverse cross-section of said cylindrical member; and said spring pressing member in said at least one first fuel spacer includes a plurality of spring holding portions which are inserted in loops of said plurality of second loop-shaped springs for holding said plurality of second loop-shaped springs, respectively, and a plurality of spring pressing portions which are brought in contact with the loops of said plurality of second loop-shaped springs from an outer peripheral side for supporting said plurality of second loop-shaped springs such that said plurality of second loop-shaped springs generate pressing forces applied to associated fuel rods, respectively.

2. A fuel assembly according to claim 1, wherein said plurality of spring holding portions include a plurality of spring holding projecting pieces and said plurality of spring pressing portions include a plurality of spring pressing projecting pieces; and said plurality of spring holding projecting pieces all project in one direction, and at least one of said plurality of spring pressing projecting pieces projects in a direction opposite to said one direction.

3. A fuel assembly according to claim 1, wherein said plurality of spring holding portions include a plurality of spring holding projecting pieces and said plurality of spring pressing portions include a plurality of spring pressing projecting pieces; and at least one of said plurality of spring pressing projecting pieces is configured such that the leading end thereof is connected to a portion opposed to the leading end of said spring pressing projecting piece of a base plate portion of said spring pressing member.

4. A fuel assembly according to claim 1, wherein said at least one first fuel spacer further includes a water rod holding member for holding said at least one water rod in the radial direction; and said spring pressing member is joined to said water rod holding member.

5. A fuel assembly according to claim 1, wherein said spring pressing member of said at least one first fuel spacer serves as a water rod holding member for holding said at least one water rod in the radial direction.

6. A fuel assembly according to claim 1, wherein said plurality of second loop-shaped springs are provided on said second lattice sides of two of said plurality of cylindrical members which are adjacent to each other on said second lattice position in the row direction and column direction.

7. A fuel assembly comprising:

a plurality of fuel rods arranged in a square lattice array, said fuel rods including a plurality of short-length fuel rods each having a fuel active length shorter than that of said fuel rods which are non-short-length fuel rods;

at least one water rod arranged in a region in which at least one of said fuel rods are arranged in said array; and a plurality of fuel spacers, provided at a plurality of positions in the axial direction, for holding said plurality of fuel rods and said at least one water rod with mutual radial intervals therebetween kept immovable;

wherein said plurality of short-length fuel rods include at least one first short-length fuel rod arranged in the outermost peripheral region of said square lattice array;

each of said plurality of fuel spacers including a plurality of cylindrical members which are connected to each other and in which said fuel rods are to be inserted respectively, a band member for surrounding the outermost peripheries of said plurality of cylindrical members, and first loop-shaped springs each of which is arranged at a joined portion between a pair of the adjacent ones of said plurality of cylindrical members for pressing two of said fuel rods inserted in said adjacent cylindrical members;

said plurality of fuel spacers including first-fuel spacers positioned above the upper end of said at least one first short-length fuel rod and at least one of said first fuel spacers is configured such that at least one of said cylindrical members, located at at least one of a first lattice position associated with said at least one first short-length fuel rod is omitted, and, instead, at least one of:

(a) a first supporting member for connecting two first cylindrical members of said plurality of cylindrical members, adjacently located on both sides of said first lattice position in the outermost peripheral region adjacent to said band member, is provided at said first lattice position, (b) a second supporting member for connecting two first cylindrical members, of said plurality of cylindrical members, adjacently located on both sides of said first lattice position in the outermost peripheral region, to a second cylindrical member, of said plurality of cylindrical members, located inwardly from and adjacently to said first lattice position, is provided at said first lattice position, and (c) said plurality of short-length fuel rods include at least one second short-length fuel rod arranged at at least one of a second lattice position adjacent to said at least one water rod, said first fuel spacers being positioned above the upper ends of said first and second short-length fuel rods, said at least one of said first fuel spacers being configured such that said plurality of cylindrical members located at said first and second lattice positions are omitted, each of said plurality of cylindrical members located at lattice positions adjacent to said second lattice position has on said second lattice position side a second loop-shaped spring for pressing said fuel rods in said cylindrical member, said plurality of second loop- shaped springs located at said lattice position adjacent to said second lattice position are supported by a spring pressing member provided at said second lattice position, said spring pressing member having a transverse cross-section smaller than a transverse cross-section of said cylindrical member, and said spring pressing member in said at least one first fuel spacer includes a plurality of spring holding portions which are inserted in loops of said plurality of second loop-shaped springs for holding said plurality of second loop-shaped springs, respectively, and a plurality of spring pressing portions which are brought in contact with the loops of said plurality of second loop-shaped springs from an outer peripheral side for supporting said plurality of second loop-shaped springs such that said plurality of second loop-shaped springs generate pressing forces applied to associated fuel rods, respectively.

* * * * *